US012548881B2

(12) United States Patent
Kim et al.

(10) Patent No.: US 12,548,881 B2
(45) Date of Patent: Feb. 10, 2026

(54) CLAMPING APPARATUS FOR ANTENNA

(71) Applicant: KMW INC., Hwaseong-si (KR)

(72) Inventors: In Ho Kim, Yongin-si (KR); Dae Myung Park, Hwaseong-si (KR); Young Ji Hong, Hwaseong-si (KR); Hee Kim, Osan-si (KR)

(73) Assignee: KMW INC., Hwaseong-si (KR)

( * ) Notice: Subject to any disclaimer, the term of this patent is extended or adjusted under 35 U.S.C. 154(b) by 81 days.

(21) Appl. No.: 18/378,657

(22) Filed: Oct. 11, 2023

(65) Prior Publication Data

US 2024/0047849 A1 Feb. 8, 2024

Related U.S. Application Data

(63) Continuation of application No. PCT/KR2022/005236, filed on Apr. 12, 2022.

(30) Foreign Application Priority Data

Apr. 12, 2021 (KR) ........................ 10-2021-0047261
Apr. 8, 2022 (KR) ........................ 10-2022-0043905

(51) Int. Cl.
*H01Q 1/12* (2006.01)
*H01Q 1/24* (2006.01)

(52) U.S. Cl.
CPC ........... *H01Q 1/1228* (2013.01); *H01Q 1/125* (2013.01); *H01Q 1/246* (2013.01)

(58) Field of Classification Search
CPC ...... H01Q 1/1228; H01Q 1/125; H01Q 1/246; H01Q 1/1264; H01Q 3/06; H01Q 3/08;
(Continued)

(56) References Cited

U.S. PATENT DOCUMENTS

2014/0103184 A1 4/2014 Asrokin et al.
2018/0083356 A1* 3/2018 Ligander ................ F16M 13/02
2020/0194884 A1* 6/2020 Clifford ................ H01Q 1/125

FOREIGN PATENT DOCUMENTS

CN 104779441 A 7/2015
CN 108365339 A * 8/2018
(Continued)

OTHER PUBLICATIONS

Translation of CN108365339A (Year: 2018).*
(Continued)

*Primary Examiner* — Renan Luque
(74) *Attorney, Agent, or Firm* — Insight Law Group, PLLC; Seung Lee

(57) ABSTRACT

The present disclosure relates to a clamping apparatus for an antenna, the apparatus particularly comprising a mounting bracket portion which serves as a medium for coupling of an antenna device to a support pole elongated in a longitudinal direction and an antenna steering driving portion which is coupled to the mounting bracket portion and drives a rear surface of the antenna device to be steered and rotated with respect to the longitudinal direction of the support pole, wherein the antenna steering driving portion includes a pair of moving sticks having a front end coupled to the rear surface of the antenna device, wherein the pair of moving sticks are moved by the same distance or different distances with the support pole therebetween so that the rear surface of the antenna device makes a tilting movement or a rotational movement with respect to the longitudinal direction of the support pole, thereby allowing easy control of the directionality of the antenna device.

15 Claims, 20 Drawing Sheets

(a) (b)

(58) Field of Classification Search
CPC .... H01Q 19/22; H01Q 1/1242; H01Q 1/1207; H01Q 1/12; H01Q 1/084; F16H 57/039; F16H 57/023
See application file for complete search history.

(56) References Cited

FOREIGN PATENT DOCUMENTS

| | | | |
|---|---|---|---|
| CN | 210576397 | U | 5/2020 |
| JP | 2001-292015 | A | 10/2001 |
| JP | 2002-223106 | A | 8/2002 |
| JP | 2013-507806 | A | 3/2013 |
| KR | 20-2011-0001413 | U | 2/2011 |
| KR | 10-2018-0088075 | A | 8/2018 |
| KR | 10-2021-0004806 | A | 1/2021 |
| KR | 10-2206659 | B1 | 1/2021 |

OTHER PUBLICATIONS

International Search Report mailed Jul. 22, 2022 for International Application No. PCT/KR2022/005236 and its English translation.
Japanese Office Action dated Sep. 24, 2024 mailed from the Japanese Patent Office for Japanese Application No. 2023-561394.
European Search Report dated Apr. 24, 2025 from European Patent Office for Application No. 22788380.8.

* cited by examiner (a)

(b)

(a) (b)

(a)

(b)

(a)

(b)

(a)

(b)

CLAMPING APPARATUS FOR ANTENNA

CROSS-REFERENCE TO RELATED APPLICATIONS

This application is a continuation application of International Application No. PCT/KR2022/005236, filed Apr. 12, 2022, which claims the benefit of Korean Patent Application Nos. 10-2021-0047261, filed Apr. 12, 2021; and 10-2022-0043905, filed Apr. 8, 2022, in the Korean Intellectual Property Office, the disclosures of which are incorporated herein in their entirety by reference.

TECHNICAL FIELD

The present disclosure relates to a clamping apparatus for an antenna, and more specifically, to a clamping apparatus for an antenna, which may mitigate a cost burden of a mounting space caused by an antenna excessively spaced apart from a support pole and at the same time, easily implement a steering movement of an antenna device including a tilting movement and a rotating movement within a limited mounting space.

BACKGROUND ART

In mobile communication systems, "base station" is a system for relaying radio waves of mobile terminals within a cell. A base station is mainly mounted on rooftops of buildings and relays radio waves of mobile terminals. Therefore, the base station is present on a cell basis, and in addition to an interface function between the mobile terminal and a switching center, the base station controls incoming and outgoing signal transmission, call channel designation, call channel monitoring, and the like on a cell basis. As an antenna device used in the base station, a control antenna capable of beam tilting vertically or horizontally has been widely used with many advantages.

As mobile communication services become more popular, the spread of antenna devices that provide a wireless network environment capable of providing the services more stably is expanding, and the mobile communication services have recently become established as 5G since 3G, 4G, and pre-5G from 2G (2 Generation) enabling only wired calls. The antenna device for 5G mobile communication may be mounted together with conventional 4G and pre-5G antenna devices to share a mounting position thereof.

However, in the conventional base station antenna devices, numerous antenna devices of various products manufactured by many manufacturers should be intensively mounted on a single support pole, and in this case, an administrator side that manages and rents the support pole requires mounting the antenna devices as close to the support pole as possible in order to rent a larger number of antenna mounting spaces, and when a determined space or more for mounting the antenna device is required, there is a problem in which a space rental fee increases.

In particular, for the efficient operation of beam forming, the antenna device needs to adjust its directionality by a tilting or rotating movement method, and there is a problem in which a space usage fee further increases because a space required for adjusting the directionality should be secured.

DISCLOSURE

Technical Problem

The present disclosure has been made in efforts to solve the above problems and is directed to providing a clamping apparatus for an antenna, which may mount an antenna device on a support pole to have a minimum separation distance.

In addition, the present disclosure is directed to providing a clamping apparatus for an antenna, which may easily mount an antenna device on a support pole and easily adjust a directionality of the antenna device including tilting and rotating movements.

In addition, the present disclosure is directed to providing a clamping apparatus for an antenna, which may selectively apply a specification in which a directionality according to only a tilting movement may be adjusted or a specification in which directionalities according to the tilting movement and a rotating movement may be adjusted to meet a mounting place of an antenna device, thereby greatly improving mounting adaptability.

The objects of the present disclosure are not limited to the above-described objects, and other objects that are not mentioned will be able to be clearly understood by those skilled in the art from the following description.

Technical Solution

A clamping apparatus for an antenna according to an embodiment of the present disclosure includes a mounting bracket unit functioning as a medium for coupling of an antenna device to a support pole disposed to extend in a longitudinal direction, and an antenna steering driving unit coupled to the mounting bracket unit and configured to drive a rear surface of the antenna device to make a steering movement with respect to the longitudinal direction of the support pole, wherein the antenna steering driving unit includes a pair of moving sticks of which a front end portion is coupled to the rear surface of the antenna device, and the pair of moving sticks are moved by the same distance or different distances with the support pole interposed therebetween so that the rear surface of the antenna device makes a tilting movement or a rotating movement with respect to the longitudinal direction of the support pole.

Here, the antenna steering driving unit may further include a steering driving motor configured to drive any one (hereinafter referred to as "first stick") of the pair of moving sticks to be axially rotated, and a motor housing which is connected to the mounting bracket unit and in which the steering driving motor is embedded, and the pair of moving sticks may be movable in a front-rear direction according to an operating direction of the steering driving motor in a state of passing through the motor housing in the front-rear direction.

In addition, a screw gear may be formed on an outer circumferential surface of the first stick to transmit an axial rotational driving force generated by the steering driving motor, and the other one (hereinafter referred to as "second stick") of the pair of moving sticks may move the same distance as an axial moving distance of the first stick while passing through the motor housing in the front-rear direction.

In addition, the antenna steering driving unit may further include a driving gear coupled to a front end of a motor shaft of the steering driving motor, and a ring gear provided inside the motor housing, provided to surround the outer circumferential surface of the first stick, having an inner circumferential surface formed with an inner teeth gear engaged with the screw gear of the first stick, and having an outer circumferential surface formed with an outer teeth gear engaged with the driving gear.

In addition, the antenna steering driving unit may further include a steering driving motor configured to drive any one (hereinafter referred to as "first stick") of the pair of moving sticks and the other one (hereinafter referred to as "second stick") of the pair of moving sticks to be axially rotated at the same time, and a motor housing which is connected to the mounting bracket unit and in which the steering driving motor is embedded, and the pair of moving sticks may be movable in a front-rear direction according to an operating direction of the steering driving motor in a state of passing through the motor housing in the front-rear direction.

In addition, screw gears may be formed on outer circumferential surfaces of the first stick and the second stick to transmit an axial rotational driving force generated by the steering driving motor, and the second stick may move the same distance as an axial moving distance of the first stick while passing through the motor housing in the front-rear direction.

In addition, the steering driving motor may include a first motor shaft and a second motor shaft extending from an inside of the motor housing toward the first stick and the second stick, respectively, and the antenna steering driving unit may further include a first driving gear and a second driving gear respectively coupled to a front end of the first motor shaft and a front end of the second motor shaft of the steering driving motor, and a first ring gear and a second ring gear provided inside the motor housing, provided to surround the outer circumferential surface of each of the first stick and the second stick, having an inner circumferential surface formed with an inner teeth gear engaged with a screw gear of each of the first stick and the second stick, and having outer circumferential surfaces formed with outer teeth gears engaged with the first driving gear and the second driving gear.

In addition, the first driving gear and the second driving gear may be provided as worm gears disposed to be orthogonal to rotational shaft of the first stick and the second stick, and the first ring gear and the second ring gear may be provided as worm wheel gears engaged with the worm gear and coaxially rotated with the rotational shafts of the first stick and the second stick.

In addition, the antenna steering driving unit may further include at least one support bearing disposed inside the motor housing and configured to support the rotations of the front end of the first motor shaft and the front end of the second motor shaft and the first driving gear and the second driving gear provided as the worm gears.

In addition, the antenna steering driving unit may further include a first steering driving motor configured to drive any one (hereinafter referred to as "first stick") of the pair of moving sticks to be axially rotated, a second steering driving motor configured to drive the other one (hereinafter referred to as "second stick") of the pair of moving sticks to be axially rotated, and a pair of motor housings which is each connected to the mounting bracket unit and in which each of the first steering driving motor and the second steering driving motor is embedded, and each of the pair of moving sticks may be movable in a front-rear direction according to one of operating directions of the first steering driving motor and the second steering driving motor in a state of passing through any one of the pair of motor housings in the front-rear direction.

In addition, a screw gear may be formed on each of outer circumferential surfaces of the first stick and the second stick to transmit axial rotational driving forces generated by the first steering driving motor and the second steering driving motor, and each of the first stick and the second stick may move the same axial moving distance or a different axial moving distance according to one of operating times of the first steering driving motor and the second steering driving motor while passing through the motor housing in the front-rear direction.

In addition, the antenna steering driving unit may further include a first driving gear and a second driving gear each coupled to one of front ends of motor shafts of the first steering driving motor and the second steering driving motor, and a pair of ring gears provided inside the motor housing, provided to surround an outer circumferential surface of each of the first stick and the second stick, having an inner circumferential surface formed with an inner teeth gear engaged with a screw gear of each of the first stick and the second stick, and having outer circumferential surfaces formed with outer teeth gears engaged with the first driving gear and the second driving gear.

In addition, when the operating times of the first steering driving motor and the second steering driving motor are the same, an upper end portion of the antenna device may make a tilting movement in the front-rear direction based on a lower end portion of the antenna device with respect to the support pole, and when the operating times of the first steering driving motor and the second steering driving motor are different, the upper end portion of the antenna device may make the tilting movement in the front-rear direction and at the same time, rotating movement in a left-right direction based on the lower end portion of the antenna device with respect to the support pole.

In addition, the mounting bracket unit may include a lower mounting bracket unit functioning as a medium for coupling of a lower end portion of the antenna device to the support pole, and an upper mounting bracket unit functioning as a medium for coupling of an upper end portion of the antenna device to the support pole, and the motor housing or the pair of motor housings may be connected to the upper mounting bracket unit.

In addition, the clamping apparatus may further include an antenna lower bracket coupled to a rear surface of the lower end portion of the antenna device and functioning as a medium for mounting of the lower end portion of the antenna device on the lower mounting bracket unit, and an antenna upper bracket coupled to a rear surface of the upper end portion of the antenna device and functioning as a medium for mounting of the upper end portion of the antenna device on front end portions of the pair of moving sticks, wherein the antenna lower bracket may be ball-joint-coupled to the lower mounting bracket unit.

In addition, a joint ball may be provided on the lower mounting bracket unit, and a ball support groove may be provided in a lower portion of the antenna lower bracket to be open downward, and the lower mounting bracket unit may further include a ball separation prevention cap configured to prevent the joint ball from being arbitrarily separated from the ball support groove from a state in which an upper end portion of the joint ball is accommodated in the ball support groove.

In addition, as a case in which one steering driving motor is provided, the front end portions of the pair of moving sticks may be hinge-coupled to the antenna upper bracket to be freely rotated with respect to each left-right horizontal axis.

In addition, as a case in which a pair of steering driving motors is provided, the front end portions of the pair of moving sticks may be ball-joint-coupled to the antenna upper bracket.

In addition, as a case in which a pair of steering driving motors is provided, each of the pair of motor housings may be ball-joint-coupled to the mounting bracket unit.

Advantageous Effects

According to the clamping apparatus for an antenna according to one embodiment of the present disclosure, it is possible to achieve various effects as follows.

First, since the antenna device may be mounted close to the support pole to occupy the minimum space, it is possible to save the space usage cost for the support pole.

Second, by providing the clamping apparatus for an antenna to remotely enable the steering movement of the antenna device in order to efficiently operate beam forming even while minimizing the space of the antenna device occupying the support pole, it is possible to easily set the directionality of the antenna.

Third, by applying the ultra-light steering driving motor, it is possible to decrease the entire weight of the product.

DESCRIPTION OF REFERENCE NUMERALS

Figure 1A:
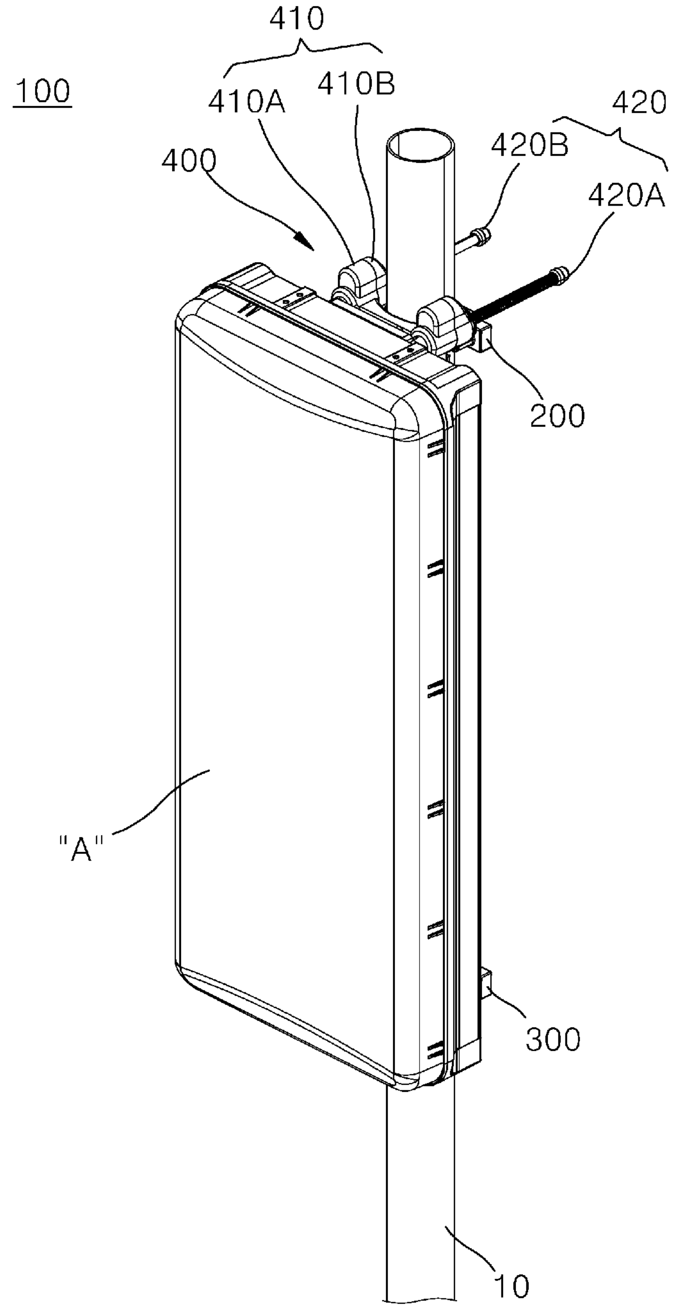
FIGS. 1A and 1B are a front perspective view and a rear perspective view illustrating a state before the steering movement of a clamping apparatus for an antenna according to one embodiment of the present disclosure.

A: antenna device 10: support pole
100, 1000, 2000: clamping apparatus 200: upper mounting bracket unit
210: front upper bracket 220: rear upper bracket
300: lower mounting bracket unit 310: front lower bracket
311: support end 320: rear lower bracket
335: joint ball 400, 1400, 2400: antenna steering driving unit
410: motor housing 410A: front housing
410B: rear housing 412: coupling hinge
413: hinge coupling end 414: hinge through-hole
415: rotating bush 420: pair of moving sticks
420A: first stick 420B: second stick
423: screw gear 425A, 425B: hook cap
427: moving guide tube 429: rotating bearing unit
440: steering driving motor 450: rotating bolt
510: antenna lower bracket 511: rear protruding end
520: antenna upper bracket 535: ball support groove
540: ball separation prevention cap 541: fastening ring
543: screw fastening unit

MODE FOR INVENTION

Hereinafter, clamping apparatuses for an antenna according to embodiments of the present disclosure will be described in detail with reference to the accompanying drawings.

In adding reference numerals to components in each drawing, it should be noted that the same components have the same reference numerals as much as possible even when they are illustrated in different drawings. In addition, in describing embodiments of the present disclosure, the detailed description of related known configurations or functions will be omitted when it is determined that the detailed description obscures the understanding of the embodiments of the present disclosure.

The terms such as first, second, A, B, (a), and (b) may be used to describe components of the embodiments of the present disclosure. The terms are only for the purpose of distinguishing a component from another, and the nature, sequence, order, or the like of the corresponding component is not limited by the terms. In addition, unless otherwise defined, all terms (including technical and scientific terms) used herein have the same meanings as those commonly understood by those skilled in the art to which the present disclosure pertains. The terms defined in a generally used dictionary should be construed as meanings that match with the meanings of the terms from the context of the related technology and are not construed as an ideal or excessively formal meaning unless clearly defined in this application.

Clamping apparatuses 100, 1000, and 2000 for an antenna according to the present disclosure include mounting bracket units 200 and 300 functioning as media for coupling of an antenna device A to a support pole 10 disposed to extend in a longitudinal direction.

Here, the mounting bracket units 200 and 300 may include the upper mounting bracket unit 200 functioning as a medium for coupling of an upper end portion of the antenna device A to the support pole 10 and a lower mounting bracket unit 300 functioning as a medium for coupling of a lower end portion of the antenna device A to the support pole 10.

Meanwhile, the clamping apparatuses 100, 1000, and 2000 for an antenna according to the present disclosure may include antenna steering driving units 400, 1400, and 2400 coupled to the upper mounting bracket unit 200 and for driving a rear surface of the antenna device A to make a steering movement with respect to a longitudinal direction of the support pole 10.

Here, the antenna steering driving units 400, 1400, and 2400 may include a pair of moving sticks 420, 1420, and 2420 of which front end portions are coupled to the rear surface of the antenna device A and control a steering movement including a tilting movement or rotating movement of the rear surface of the antenna device A with respect to the longitudinal direction of the support pole 10 by the pair of moving sticks 420, 1420, and 2420 moving the same distance or different distances.

Hereinafter, the term "tilting movement" among the terms described may be a behavior in which the antenna device A is rotated forward at a predetermined angle with respect to the longitudinal direction of the support pole 10, the term "rotating movement" among the terms described may be a behavior in which both left and right end portions are swung with respect to an arbitrary axis parallel to the support pole 10, and the term "steering movement" among the terms described may be a concept including a concept of both the above-described tilting movement and rotating movement, and embodiments of the present disclosure will be described in detail based on these terms.

As the pair of moving sticks 420, 1420, and 2420 will be described below, embodiments of the present disclosure may be classified into one embodiment and another embodiment depending on whether only one moving stick is involved in a rotational driving force of the tilting movement or the rotating movement (hereinafter referred to as "one embodiment" and see FIGS. 1A to 9 to be described below) or whether two moving sticks are involved in the rotational driving force of the tilting movement or the rotating movement (hereinafter referred to as "another embodiment" and see FIGS. 10 to 12 to be described below) as a case in which one of the steering driving motors 440 and 1440 among components of the antenna steering driving units 400 and 1400 is provided, and classified into still another embodiment in a pair of moving sticks 2420A and 2420B are involved in both the rotational driving force of the tilting movement or the rotating movement as a case in which a pair of steering driving motors 2440A and 2440B among components of the antenna steering driving unit 2400 is provided (see FIGS. 13 to 16 to be described below).

For reference, there is a difference in that in the clamping apparatus 100 for an antenna according to one embodiment of the present disclosure and the clamping apparatus 1000 for an antenna according to another embodiment of the present disclosure, as one of the steering driving motors 440 and 1440 among the components of the antenna steering driving units 400 and 1400, which will be described below, is provided and the pair of moving sticks 420 and 1420 are provided to move the same distance by the driving force of one of the steering driving motors 440 and 1440, it is possible to implement only the tilting movement of the antenna device A, while in the clamping apparatus 2000 for an antenna according to the still another embodiment of the present disclosure, as the pair of steering driving motors 2440A and 2440B among the components of the antenna steering driving unit 2400, which will be described below, are provided and each of the pair of moving sticks 2420A and 2420B is provided to move the same distance or a different distance by an independent driving force of each of the pair of moving sticks 2420A and 2420B, it is possible to implement not only the tilting movement but also the rotating movement of the antenna device A.

Figure 1B:
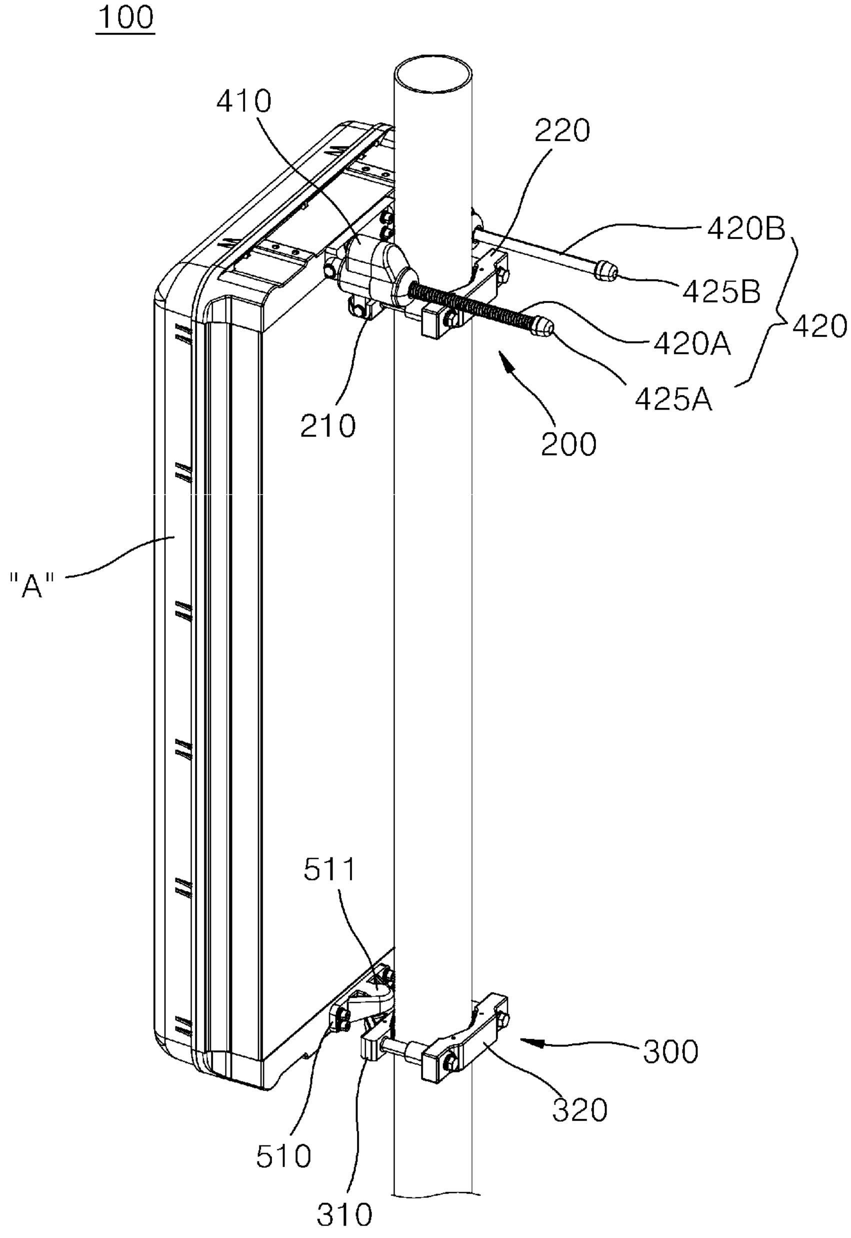
Figure 2:
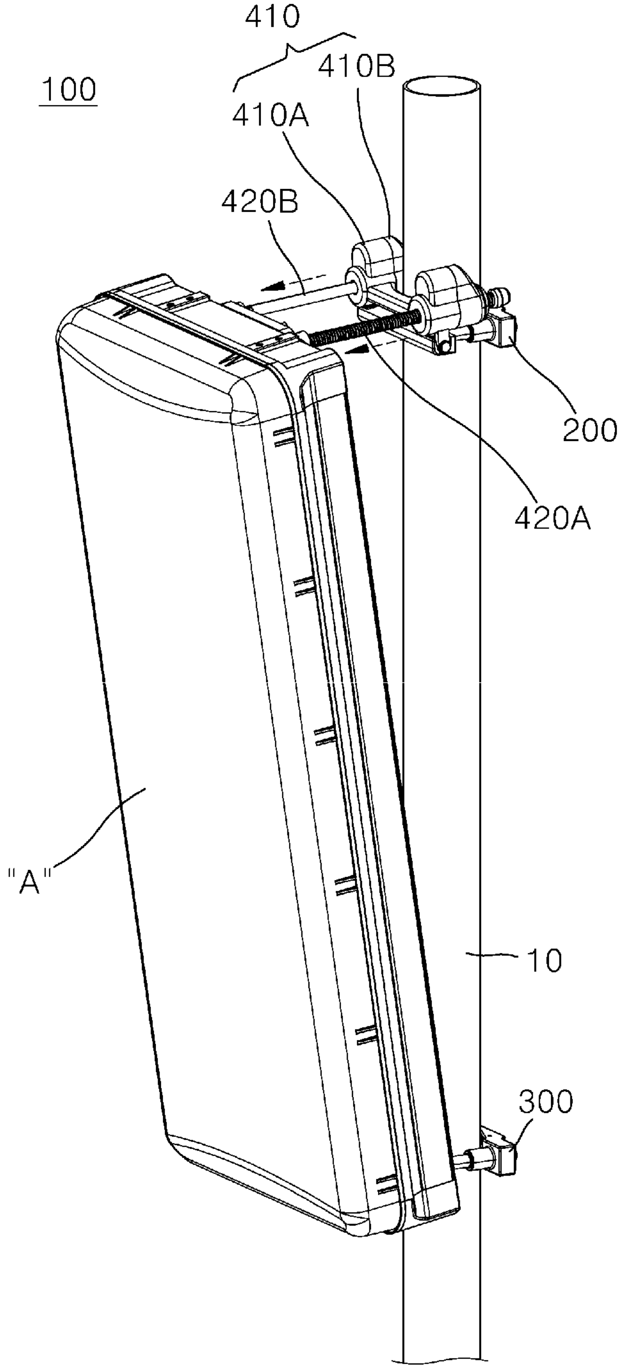
FIGS. 2 and 3 are a perspective view and a side view illustrating a state after the steering movement of the clamping apparatus for an antenna according to one embodiment of the present disclosure.
Figure 3:
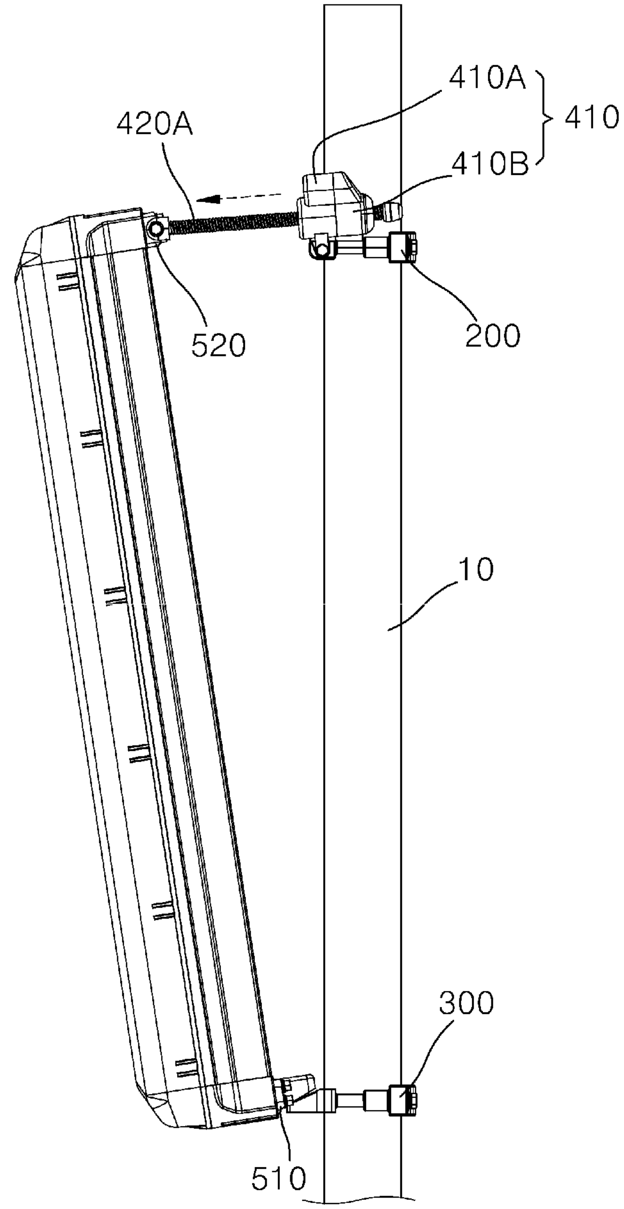
Figure 4A:
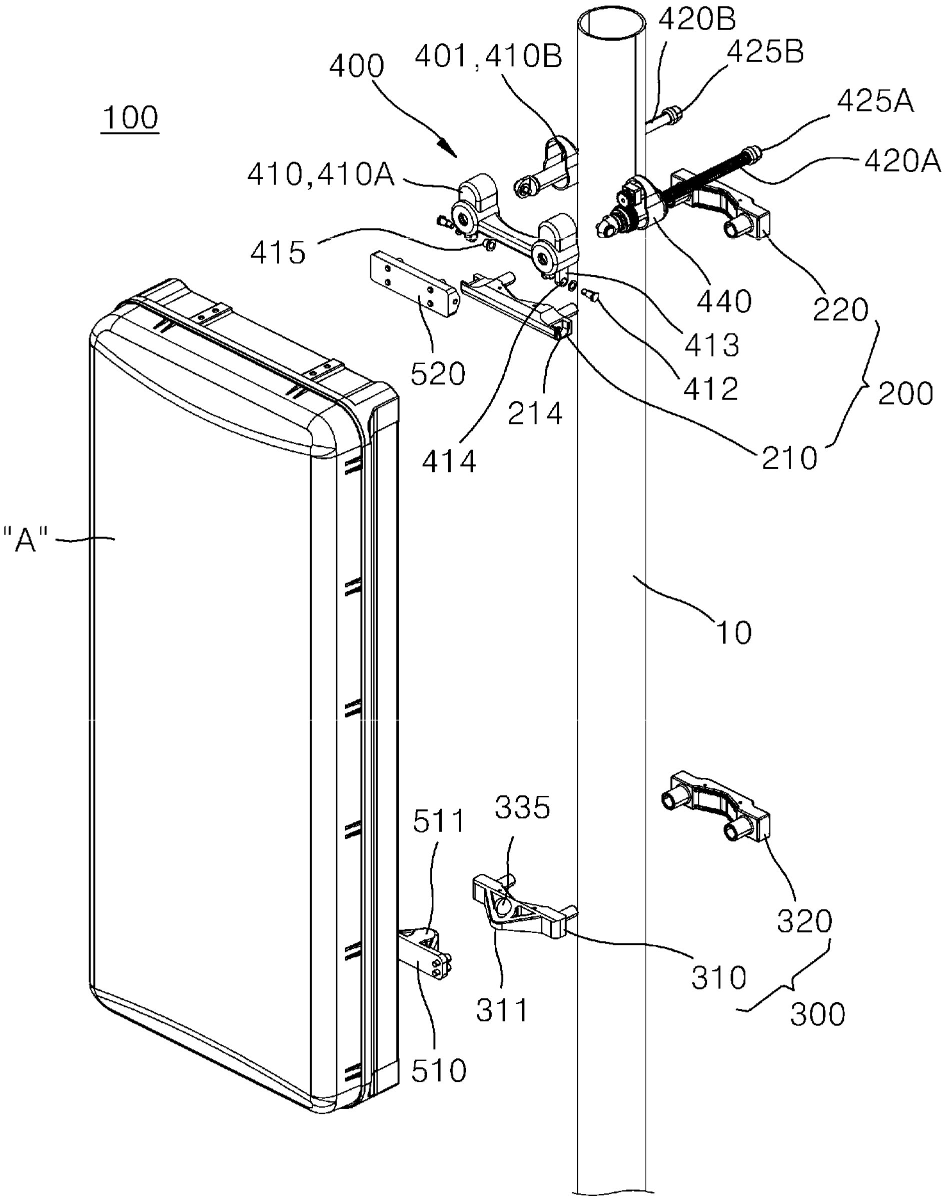
FIGS. 4A and 4B are exploded perspective views illustrating the clamping apparatus for an antenna according to one embodiment of the present disclosure.
Figure 4B:
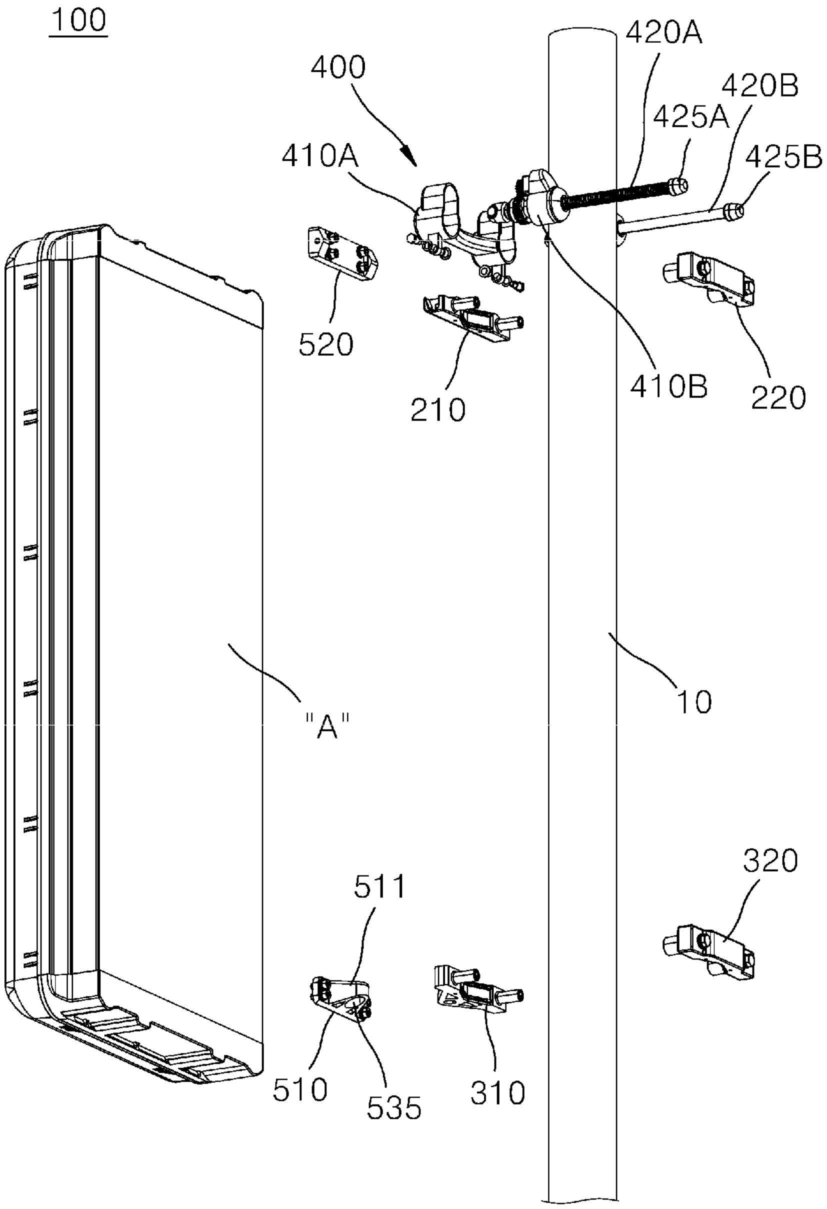

FIGS. 1A and 1B are a front perspective view and a rear perspective view illustrating a state before the steering movement of the clamping apparatus for an antenna according to one embodiment of the present disclosure, FIGS. 2 and 3 are a perspective view and a side view illustrating a state after the steering movement of the clamping apparatus for an antenna according to one embodiment of the present disclosure, and FIGS. 4A and 4B are exploded perspective views illustrating the clamping apparatus for an antenna according to one embodiment of the present disclosure.

In the clamping apparatus 100 for an antenna according to one embodiment of the present disclosure, as illustrated in FIGS. 1A to 4B, the antenna steering driving unit 400 may include the pair of moving sticks 420, the steering driving motor 440 for driving any one 420A (hereinafter referred to as "first stick") of the pair of moving sticks 420 to be axially rotated, and a motor housing 410 in which the steering driving motor 440 is embedded.

Here, as illustrated in FIGS. 1A and 1B, the pair of moving sticks 420 may be disposed to be substantially orthogonal in a front-rear direction based on the support pole 10. In this case, the pair of moving sticks 420 may be disposed with the support pole 10 interposed therebetween.

In addition, the first stick 420A, which is one of the pair of moving sticks 420, may be axially rotated by receiving a rotational driving force from the steering driving motor 440, and the other one 440B (hereinafter referred to as "second stick") of the pair of moving sticks 420 may function to guide the tilting movement of the antenna device A with respect to the longitudinal direction of the support pole 10 by moving the same distance in the front-rear direction together when the first stick 420A moves in the front-rear direction.

A screw gear 423 may be formed on an outer circumferential surface of the first stick 420A of the pair of moving sticks 420 to receive the rotational driving force from the steering driving motor 440 through gear engagement. Since a hook cap 425A or 425B may be provided on a rear end portion of each of the pair of moving sticks 420A and 420B and caught on a rear surface portion of the motor housing 410, moving distances of the pair of moving sticks 420A and 420B in the front-rear direction may be restricted.

The pair of moving sticks 420 may move in the front-rear direction in a state of passing through the motor housing 410 in the front-rear direction.

In this case, as illustrated in FIGS. 1A and 1B, the motor housing 410 may be connected to the upper mounting bracket unit 200 among components of the mounting bracket units 200 and 300. In particular, the motor housing 410 may be hinge-coupled to the upper mounting bracket unit 200 so as not to interfere with the tilting movement of the antenna device A according to the passing-through movement of the pair of moving sticks 420.

More specifically, as illustrated in FIGS. 4A and 4B, each of hinge coupling holes 214 formed to be open in a left-right horizontal direction may be formed in one of both left and right end portions of a front upper bracket 210, which will be described below, among components of the upper mounting bracket unit 200, hinge coupling ends 413 in which hinge through-holes 414 matched with the hinge coupling holes 214 of the front upper bracket 210 are formed may be provided at lower sides of both left and right end portions of the motor housing 410, and the motor housing 410 may be hinge-coupled to the upper mounting bracket unit 200 by an operation of coupling hinges 412 fastened by passing through the hinge through-holes 414 and the hinge coupling holes 214.

In addition, a rotating bush 415 for guiding smooth hinge rotation of the coupling hinge 412 may be interposed in the hinge through-hole 414.

Here, the first stick 420A of the pair of moving sticks 420 may function to allow the upper end portion of the antenna device A coupled to a front end portion thereof to make the tilting movement based on a lower end portion thereof while moved in the front-rear direction in a state in which the rotation is supported by the motor housing 410 while axially rotated by receiving the rotating force directly from the steering driving motor 440, and the second stick 420B of the pair of moving sticks 420 may guide the tilting movement of the antenna device A by moving the same distance as the axially moving distance of the first stick 420A in the front-rear direction according to an operating direction of the steering driving motor 440 in a state of passing through the motor housing 410.

Figure 5:
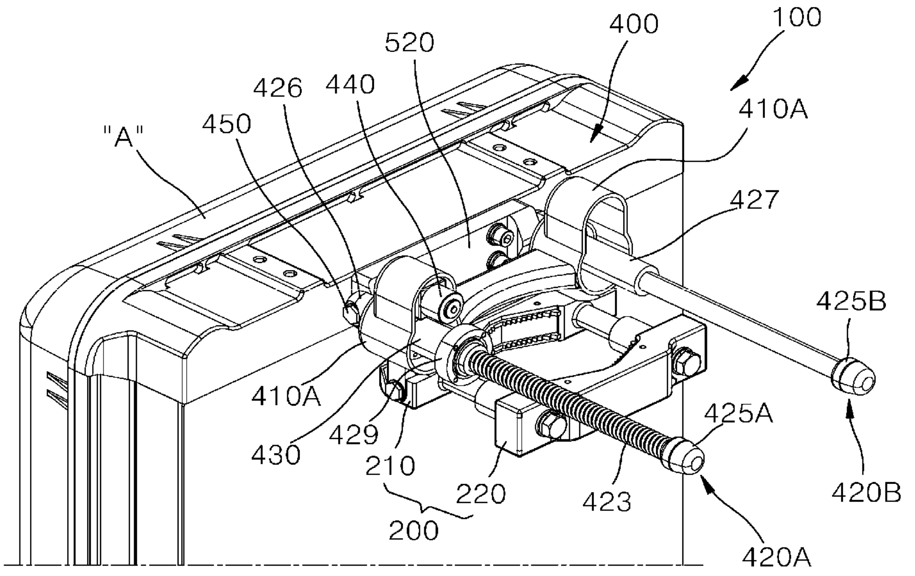
FIG. 5 is a perspective view illustrating an antenna steering driving unit among components of the clamping apparatus for an antenna according to one embodiment of the present disclosure.
Figure 6A:
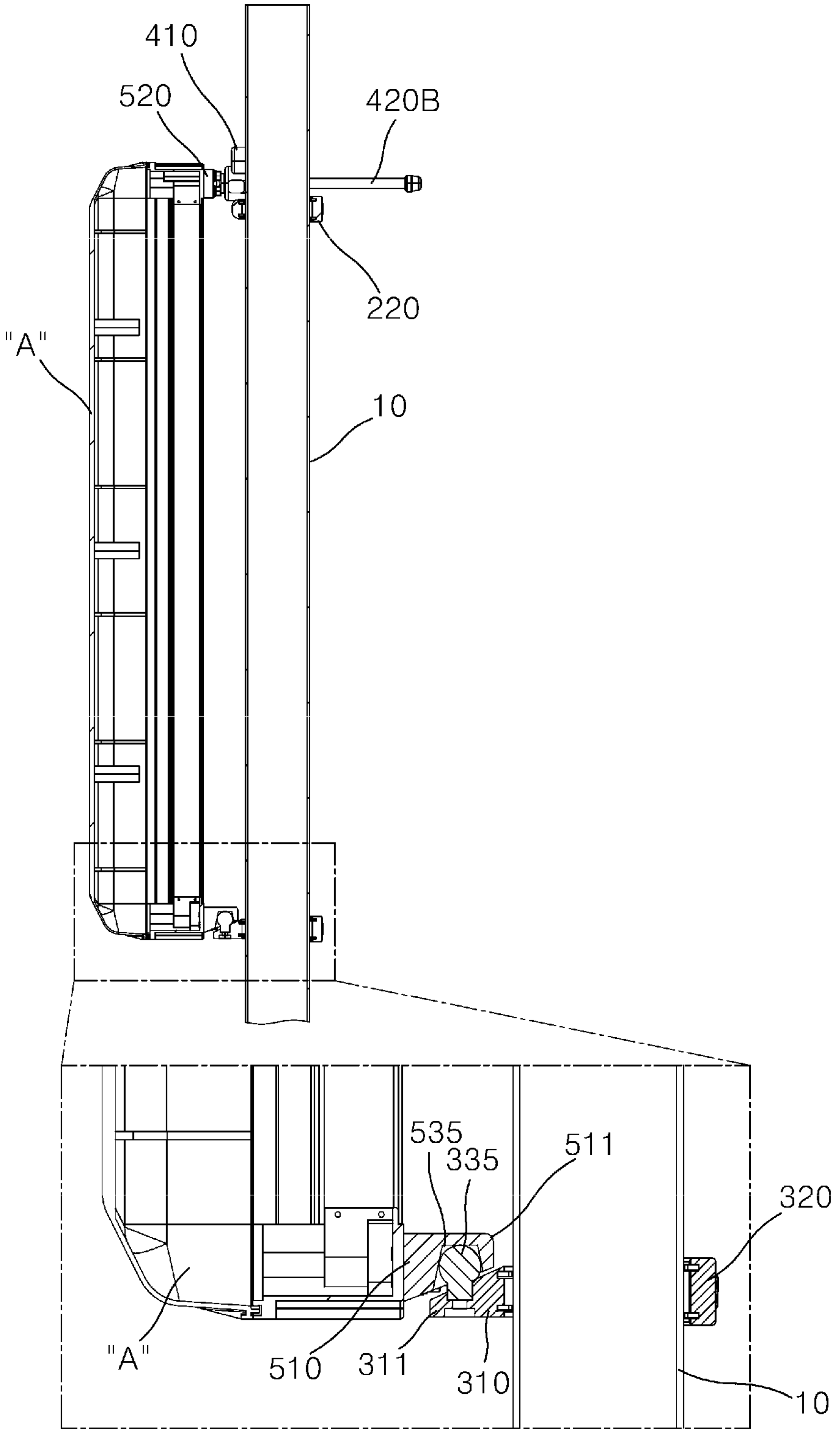
FIGS. 6A and 6B are a cross-sectional view and a cutout perspective view illustrating a connection state to a lower mounting bracket unit among the components of the clamping apparatus for an antenna according to one embodiment of the present disclosure.
Figure 6B:
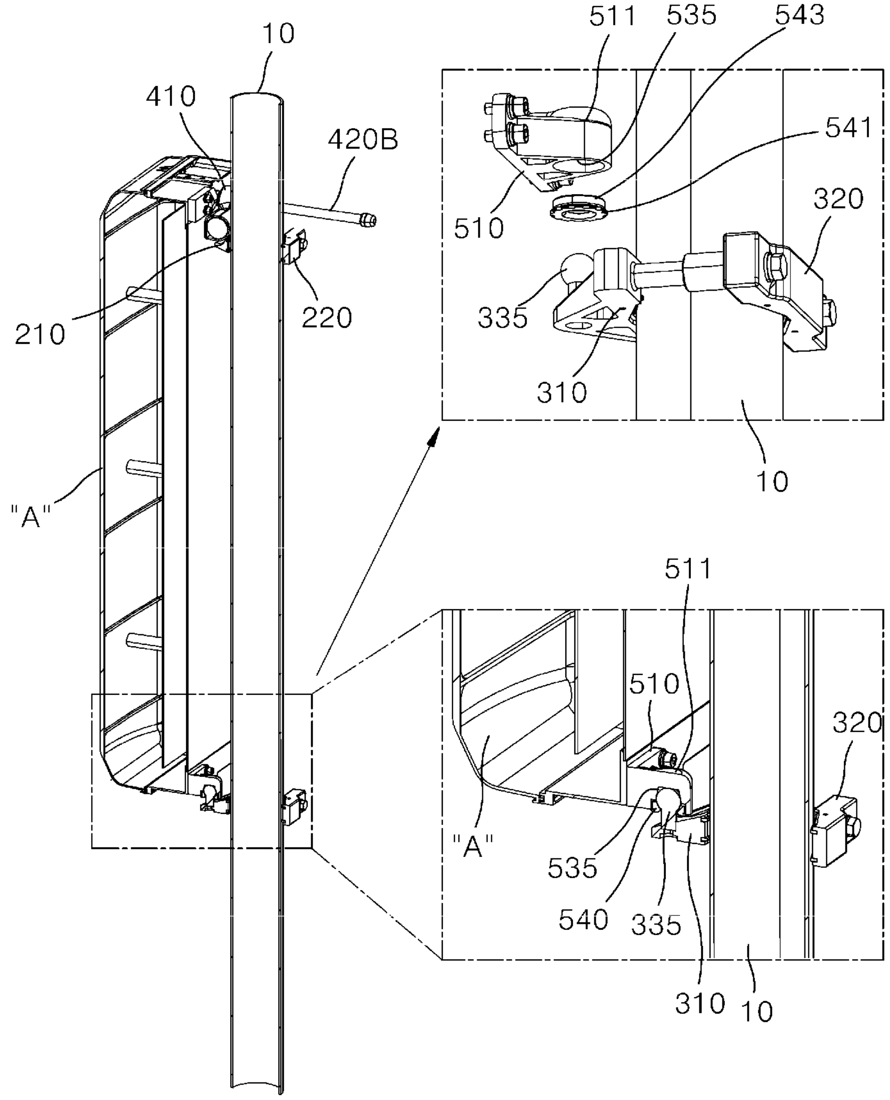
Figure 7A:
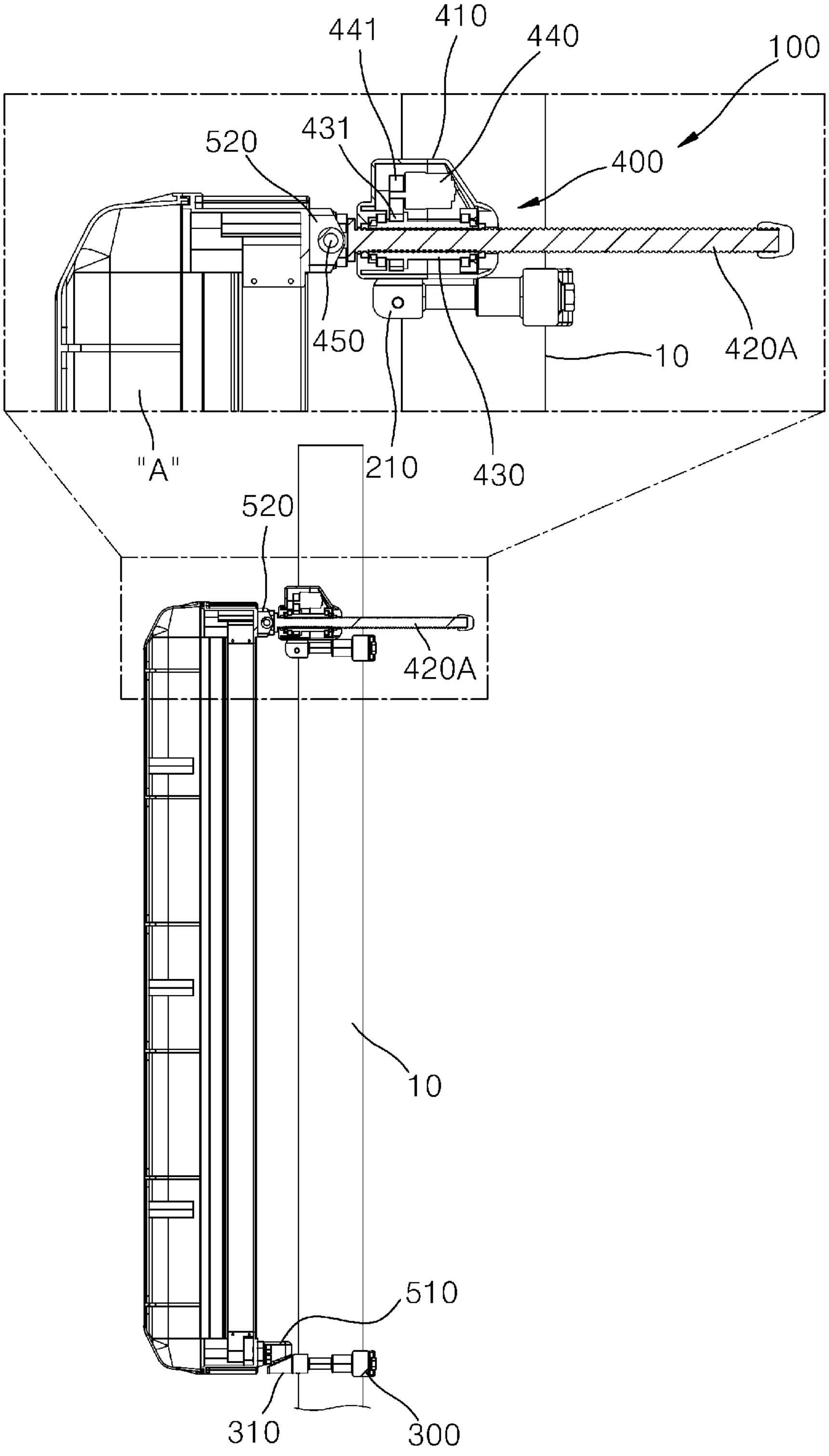
FIGS. 7A and 7B are a cross-sectional view and a cutout perspective view illustrating a connection state to an upper mounting bracket unit and a connection state to the antenna steering driving unit among the components of the clamping apparatus for an antenna according to one embodiment of the present disclosure.
Figure 7B:
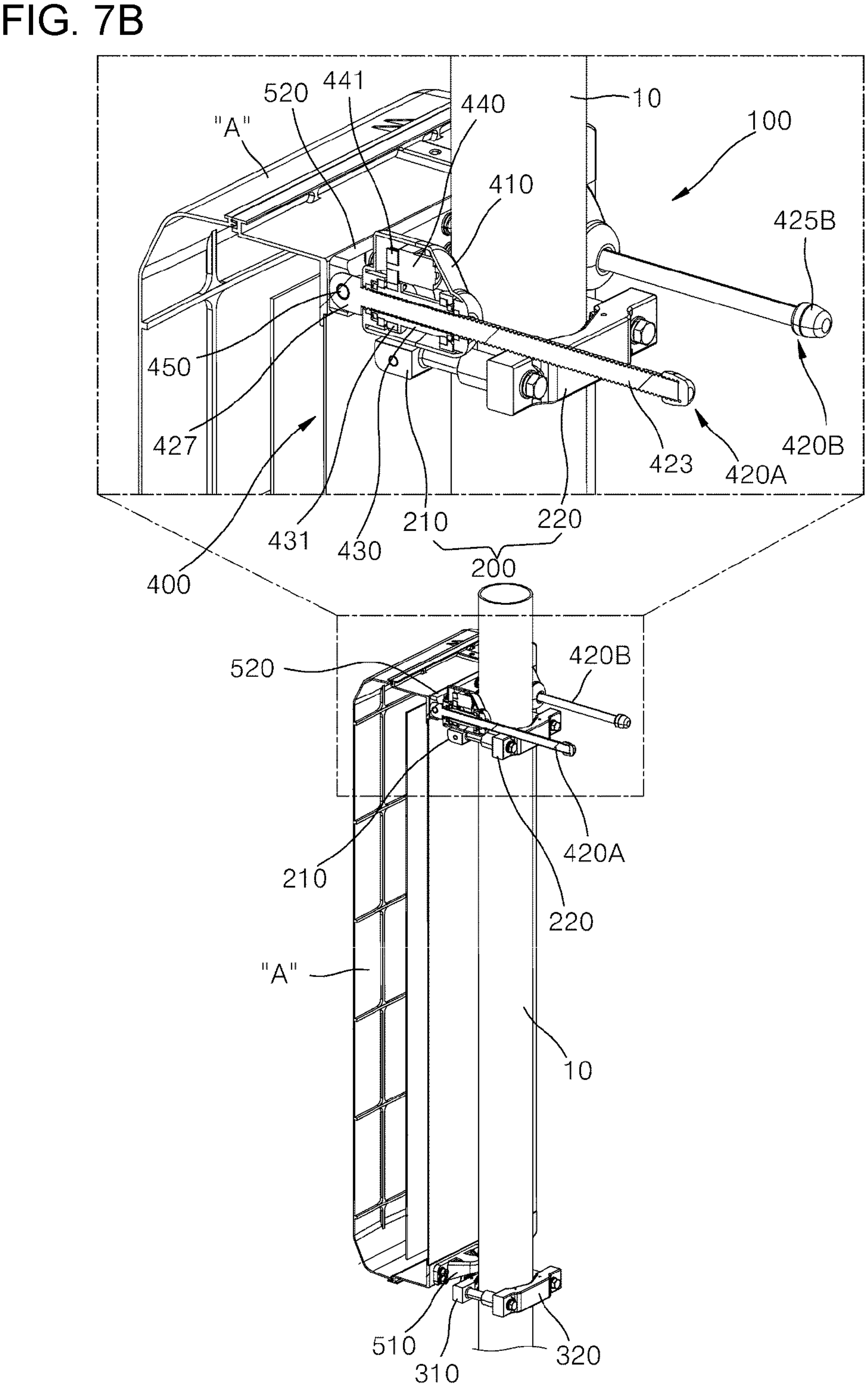
Figure 8:
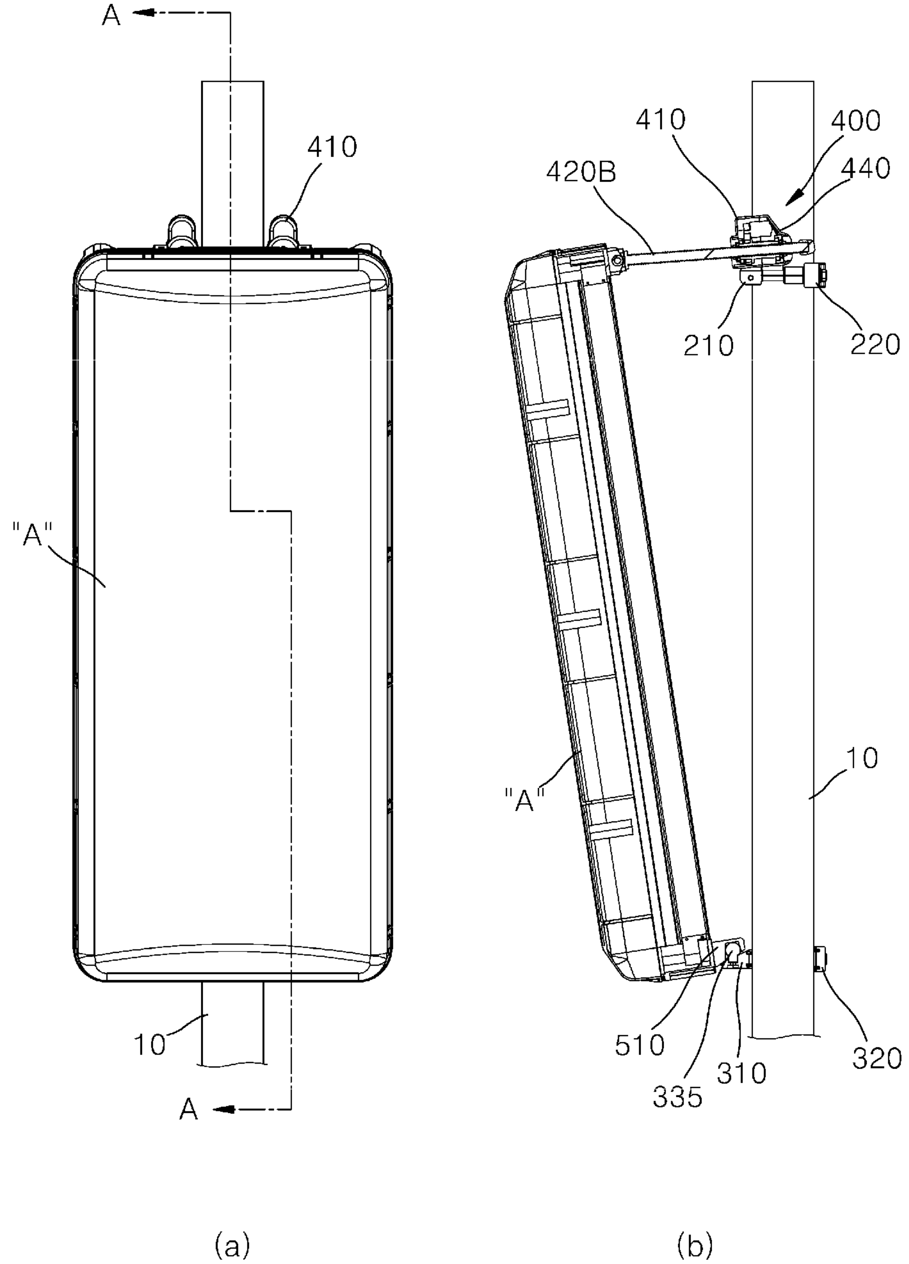
FIG. 8 is a front view illustrating a state after the steering movement of the clamping apparatus for an antenna according to one embodiment of the present disclosure and a cross-sectional view of the clamping apparatus for an antenna along line A-A.
Figure 9:
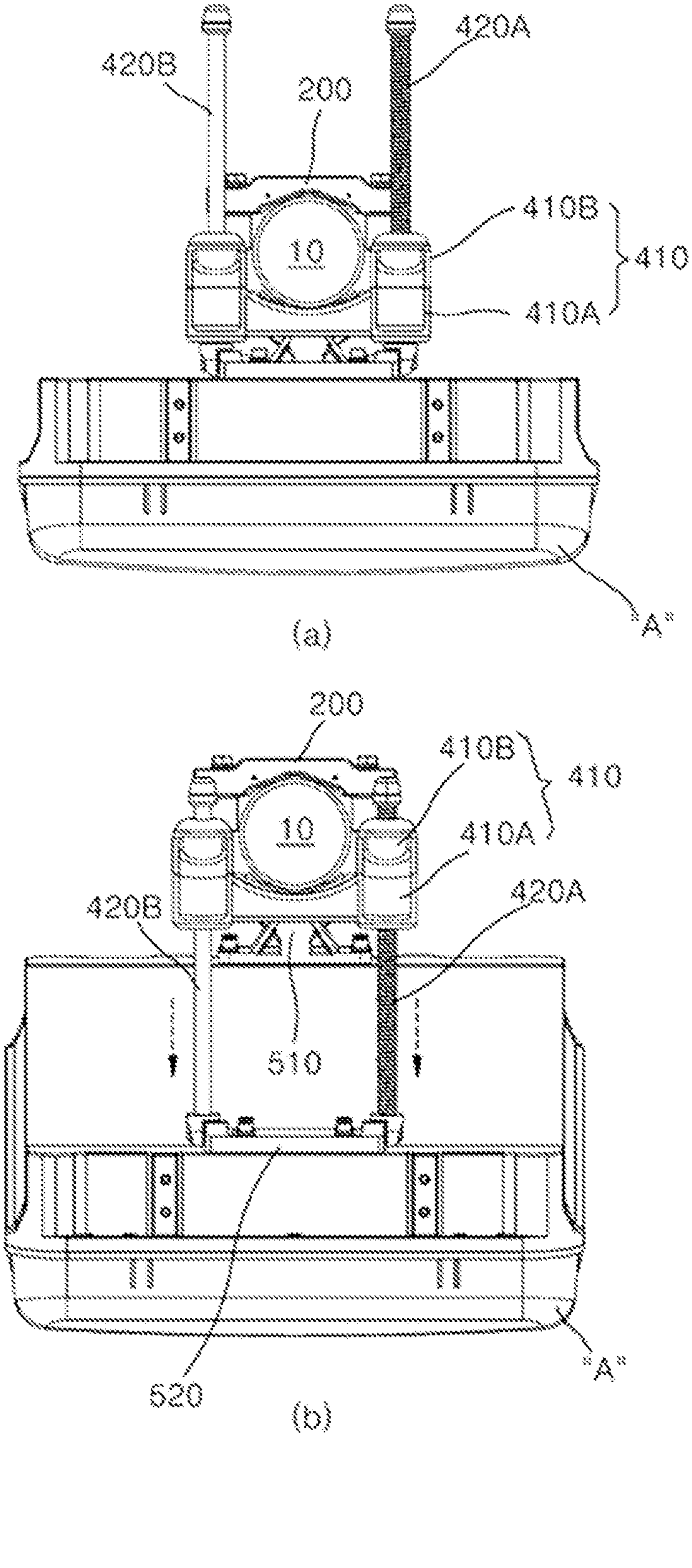
FIG. 9 is a plan view illustrating states of before and after the steering movement of the clamping apparatus for an antenna according to one embodiment of the present disclosure.

FIG. 5 is a perspective view illustrating an antenna steering driving unit among components of the clamping apparatus for an antenna according to one embodiment of the present disclosure, FIGS. 6A and 6B are a cross-sectional view and a cutout perspective view illustrating a connection state to a lower mounting bracket unit among the components of the clamping apparatus for an antenna according to one embodiment of the present disclosure, FIGS. 7A and 7B are a cross-sectional view and a cutout perspective view illustrating a connection state to an upper mounting bracket unit and a connection state to the antenna steering driving unit among the components of the clamping apparatus for an antenna according to one embodiment of the present disclosure, FIG. 8 is a front view illustrating a state after the steering movement of the clamping apparatus for an antenna according to one embodiment of the present disclosure and a cross-sectional view of the clamping apparatus for an antenna along line A-A, and FIG. 9 is a plan view illustrating states before and after the steering movement of the clamping apparatus for an antenna according to one embodiment of the present disclosure.

As illustrated in FIGS. 5 to 9, the antenna steering driving unit 400 may further include a driving gear 441 coupled to a front end of a motor shaft of the steering driving motor 440, and a ring gear 430 provided inside the motor housing 410, provided to surround an outer circumferential surface of the first stick 420A, having an inner circumferential surface formed with an inner tooth gear (not illustrated) engaged with the screw gear 423 of the first stick 420A, and having an outer circumferential surface formed with an outer tooth gear (not illustrated) engaged with the driving gear 441.

As illustrated in FIGS. 4A and 4B, the motor housing 410 may be classified into a front housing 410A and a rear housing 410B, a space in which the driving gear 441 and the ring gear 430 in addition to the steering driving motor 440 are embedded may be formed between the front housing 410A and the rear housing 410B, and the front housing 410A and the rear housing 410B may be disposed so that the first stick 420A and the second stick 420B pass therethrough in the front-rear direction, respectively.

Here, a rotating bearing unit 429 for supporting the axial rotation of the first stick 420A may be interposed inside the motor housing 410, and a moving guide tube 427 for guiding the movement of the second stick 420B in the front-rear direction may be embedded therein.

The motor housing 410 having such a configuration may be bolting-coupled to the upper mounting bracket unit 200 coupled to relatively an upper portion of an outer circumferential surface of the support pole 10. Here, the motor housing 410 may be bolting-coupled to an upper end portion of the upper mounting bracket unit 200 so that the upper end portion may be rotated in the front-rear direction with respect to the upper mounting bracket unit 200. This is for facilitating the tilting movement operation of the antenna device A.

As illustrated in FIGS. 1A to 4B, the upper mounting bracket unit 200 may include the front upper bracket 210 surrounding an outer circumferential surface of a front portion of the support pole 10 and a rear upper bracket 220 surrounding an outer circumferential surface of a rear portion of the support pole 10, and the front upper bracket 210 and the rear upper bracket 220 may be bolting-coupled to firmly support a load of a weight including the antenna device A.

Meanwhile, as illustrated in FIGS. 1A to 4B, the lower end portion of the antenna device A may be coupled to the support pole 10 so that the upper end portion of the antenna device A may make the tilting movement in the front-rear direction with respect to the longitudinal direction of the support pole 10 via the lower mounting bracket unit 300.

Here, as illustrated in FIGS. 1A to 4B, the lower mounting bracket unit 300 may include a front lower bracket 310 surrounding the outer circumferential surface of the front portion of the support pole 10 and a rear lower bracket 320 surrounding the outer circumferential surface of the rear portion of the support pole 10, and the front lower bracket 310 and the rear lower bracket 320 may be bolting-coupled to firmly support the load of the weight including the antenna device A together with the upper mounting bracket unit 200.

In particular, as illustrated in FIGS. 4A and 4B, the front lower bracket 310 of the lower mounting bracket unit 300 may further include a support end 311 of which a portion of a front end portion is formed to protrude to the antenna device A side, a joint ball 335 may be provided on the support end 311, and the joint ball 335 may be inserted into a ball support groove 535 formed in a rear protruding end 511 of an antenna lower bracket 510 to be described below provided at the lower end portion side of the antenna device A to easily support the rotations even when the upper end portion of the antenna device A makes not only the tilting movement but also the rotating movement in the front-rear direction.

As illustrated in FIG. 5, a front end portion 426 of each of the pair of moving sticks 420 may be coupled to the antenna upper bracket 520 provided on an upper end portion of a rear surface of the antenna device A. Here, since the front end portion 426 of each of the pair of moving sticks 420 may be hinge-coupled to be freely rotated about a left-right horizontal axis via a rotating bolt 450, the tilting movement of the antenna device A in the front-rear direction may be possible.

In addition, as illustrated in FIG. 6A, the antenna lower bracket 510 functioning as a medium for connection with the front lower bracket 310 among components of the lower mounting bracket unit 300 may be bolting-coupled to the lower end portion of the antenna device A. A portion of the antenna lower bracket 510 may be coupled so that the joint ball 335 provided on the support end 311 of the front lower bracket 310 among the components of the lower mounting bracket unit 300 coupled to the outer circumferential surface of the support pole 10 is mounted in the ball support groove 535 and may be ball-joint-coupled.

As illustrated in FIGS. 6A and 6B, the joint ball 335 may be manufactured separately from the front lower bracket 310 among the components of the lower mounting bracket unit 300, coupled to protrude upward from an upper surface of the support end 311 of the front lower bracket 310, and integrally formed with a component corresponding to the support end 311 of the front lower bracket 310 among the components of the lower mounting bracket unit 300.

Therefore, the antenna device A may be entirely coupled at three points by coupling the upper end portion of the rear surface at two points by the pair of moving sticks 420 as described above and coupling the lower end portion of the rear surface to the lower mounting bracket unit 300 at one point.

Here, when the antenna device A is suddenly lifted in the mounting process, the joint ball 335 may be arbitrarily separated from the ball support groove 535 in that the antenna device A is provided so that the joint ball 335 fixed to the front lower bracket 310 is mounted by being inserted into the ball support groove 535 of the rear protruding end 511 of the antenna lower bracket 510 formed to be open downward.

In order to prevent the separation of the joint ball 335 from the ball support groove 535, as illustrated in FIG. 6B, the clamping apparatus 100 for an antenna according to one embodiment of the present disclosure may further include a ball separation prevention cap 540.

The ball separation prevention cap 540 may include a fastening ring 541 in which a plurality of fastening grooves are formed to be spaced apart from each other in an annular shape to be fastened using a separate tool (not illustrated) and a screw fastening unit 543 formed on an outer circumferential portion in a screw shape (not illustrated) to be fastened to an inner surface of the ball support groove 535.

The ball separation prevention cap 540 may be formed in a ring shape and formed with a hollow (no reference numeral) having a smaller inner diameter than a maximum diameter of a ball portion of the joint ball 335, and when the ball portion of the joint ball 335 is assembled to be positioned above in advance through the lower end portion of the joint ball 335 before the joint ball 335 is coupled to the support end 311 of the front lower bracket 310, and then the ball portion of the joint ball 335 is inserted into the ball support groove 535, the screw fastening unit 543 may be screw-fastened to the inner surface of the ball support groove 535 by an operation of rotating the fastening ring 541 using a separate tool.

Here, since the maximum diameter of the joint ball 335 is larger than the inner diameter of the hollow of the ball separation prevention cap 540, it is possible to prevent the antenna device A from being arbitrarily lifted.

As illustrated in FIGS. 5 to 9, the clamping apparatus 100 for an antenna according to one embodiment of the present disclosure configured as described above may allow the antenna device A to make the tilting movement by moving the first stick 420A in the axial direction (i.e., the front-rear direction) by a predetermined distance via the driving gear 441 and the ring gear 430 and moving the upper end portion of the antenna device A in the front-rear direction based on the coupled portion of the lower end portion thereof and the lower mounting bracket unit 300 when the steering driving motor 440 provided as a single one is electrically driven, and in this case, guide the tilting movement of the antenna device A by moving the second stick 420B in the same direction by the same distance as well.

Here, since each of the pair of moving sticks 420 is provided to prevent the front end and the rear end from passing through the center of the support pole 10 while moved in the front-rear direction and thus the tilting movement is possible in a state in which the antenna device A is maximally close to the support pole 10, there is an advantage in that it is possible to minimize the mounting space in the support pole 10.

Figure 10:
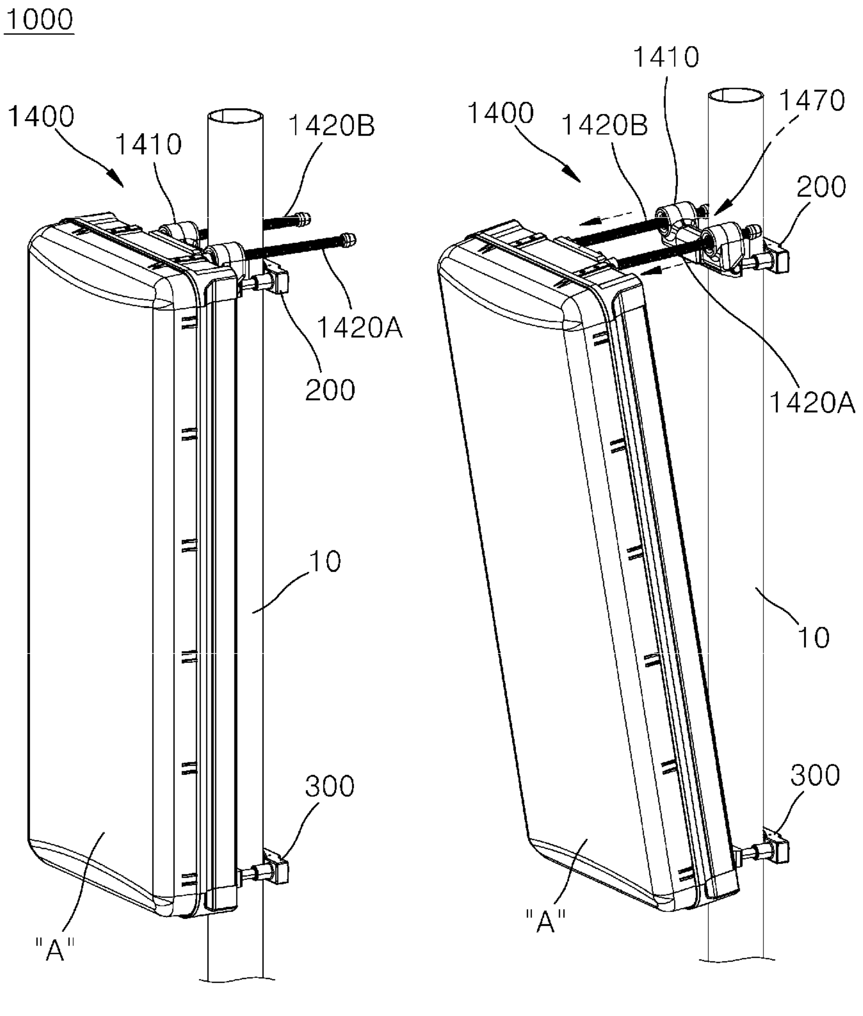
FIG. 10 is a perspective view illustrating states before and after the steering movement of a clamping apparatus for an antenna according to another embodiment of the present disclosure.
Figure 11:
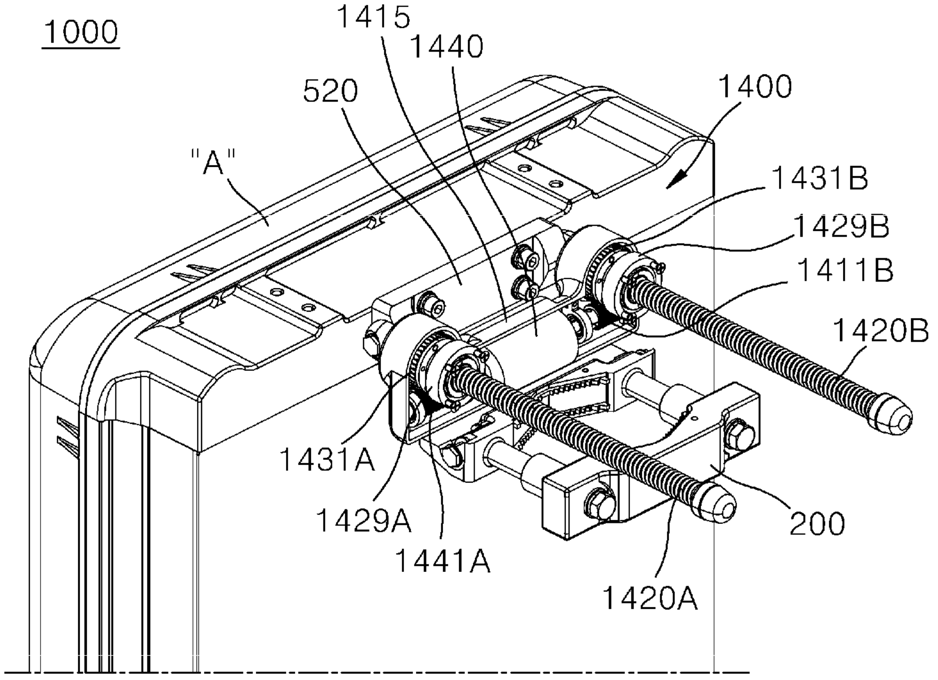
FIG. 11 is a perspective view illustrating an antenna steering driving unit among components of the clamping apparatus for an antenna according to another embodiment of the present disclosure.
Figure 11:
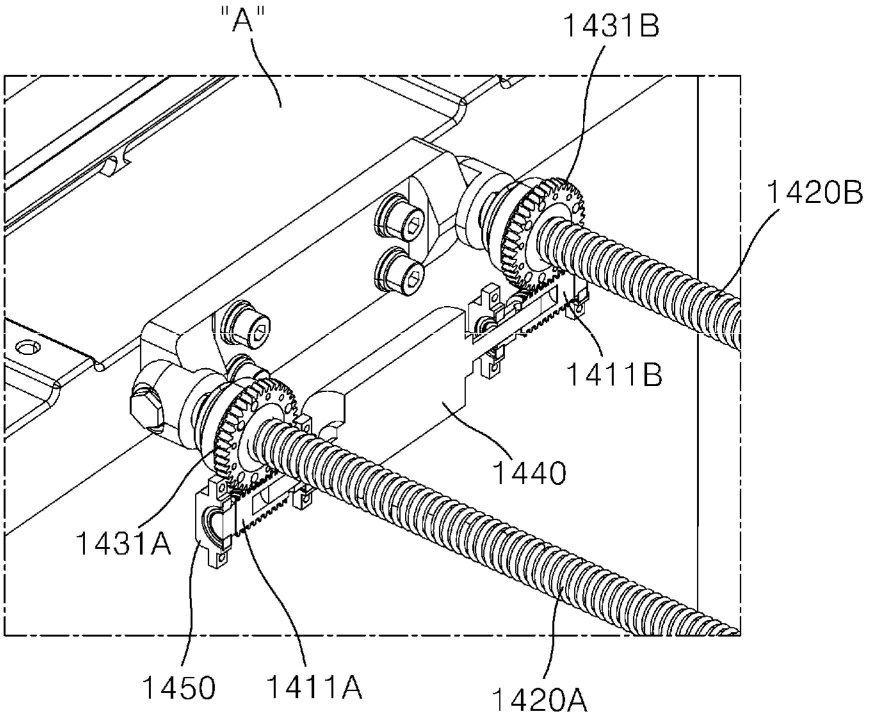
Figure 12:
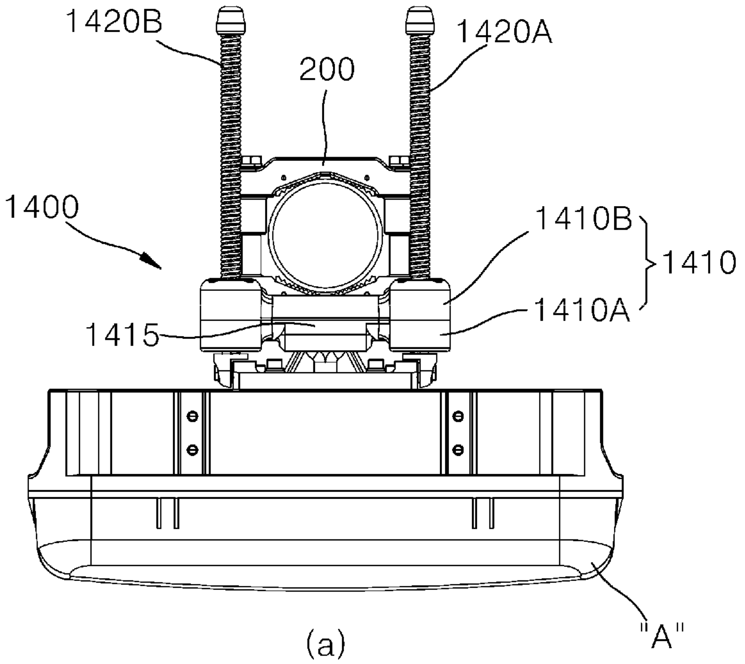
FIG. 12 is a plan view illustrating states of before and after the steering movement of the clamping apparatus for an antenna according to another embodiment of the present disclosure.
Figure 12:
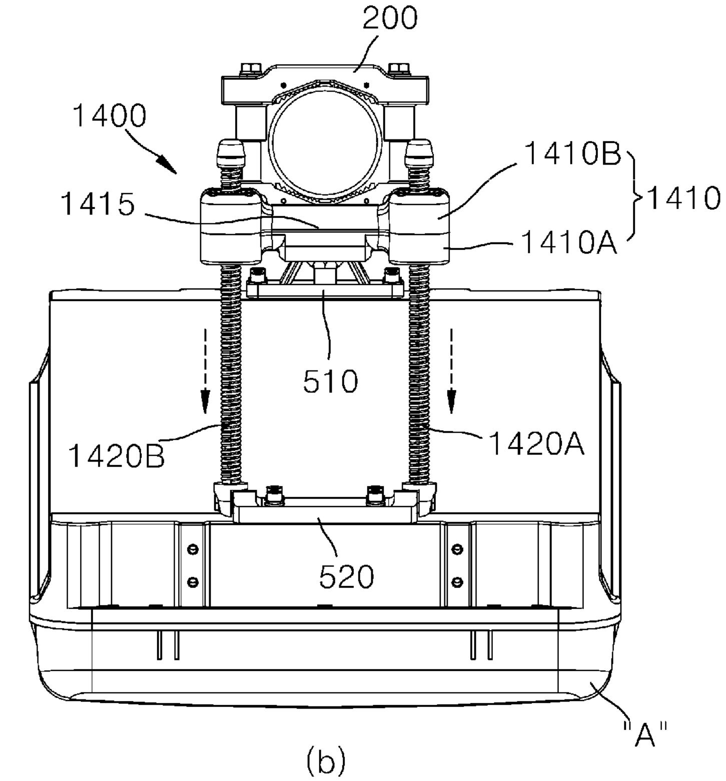

FIG. 10 is a perspective view illustrating states before and after the steering movement of a clamping apparatus for an antenna according to another embodiment of the present disclosure, FIG. 11 is a perspective view illustrating an antenna steering driving unit among the components of the clamping apparatus for an antenna according to another embodiment of the present disclosure, and FIG. 12 is a plan view illustrating states before and after the steering movement of the clamping apparatus for an antenna according to another embodiment of the present disclosure.

In the clamping apparatus 100 for an antenna according to one embodiment of the present disclosure described with reference to FIGS. 1A to 9, since only one (first stick 420A) of the pair of moving sticks 420 receives the rotational driving force from the steering driving motor 440, it may be difficult to implement the stable tilting movement of the antenna device A.

The clamping apparatus 1000 for an antenna according to another embodiment of the present disclosure is provided to allow the antenna device A to stably make the tilting movement in the front-rear direction by all of the pair of moving sticks 1420 simultaneously receiving the rotational driving force of the steering driving motor 1440 provided as a single one among components of the antenna steering driving unit 1400 in order to solve the above-described problem of the clamping apparatus 100 for an antenna according to one embodiment.

To this end, as illustrated in FIGS. 10 to 12, the clamping apparatus 1000 for an antenna according to another embodiment of the present disclosure may include the steering driving motor 1440 for driving a first stick 1420A and a second stick 1420B of the pair of moving sticks 1420 to be axially rotated at the same time, and a motor housing 1410 in which the steering driving motor 1440 is embedded.

Here, as illustrated in FIG. 11, the steering driving motor 1440 may be disposed to extend in a left-right direction inside a connecting unit 1415 of the motor housing 1410, may have a motor shaft (no reference numeral) extending to protrude from each of both left and right end portions of the steering driving motor 1440 toward the first stick 1420A and the second stick 1420B, and simultaneously transmit the rotational driving force to the first stick 1420A and the second stick 1420B via driving gears 1441A and 1441B to be described below interposed in each of the motor shafts.

Meanwhile, as illustrated in FIGS. 10 to 12, the antenna steering driving unit 1400 may further include the first driving gear 1441A and the second driving gear 1441B coupled to a front end of a first motor shaft and a front end of a second motor shaft of the steering driving motor 1440, and a pair of ring gears 1431A and 1431B (i.e., the first ring gear 1431A and the second ring gear 1431B) provided inside the motor housing 1410, provided to surround an outer circumferential surface of each of the first stick 1420A and the second stick 1420B, each having an inner circumferential surface formed with an internal teeth gear (not illustrated) engaged with a screw gear (no reference numeral) of each of the first stick 1420A and the second stick 1420B, and having outer circumferential surfaces formed with outer teeth gears (not illustrated) engaged with the first driving gear 1441A and the second driving gear 1441B.

Here, the first driving gear 1441A and the second driving gear 1441B may be provided as worm gears disposed to be orthogonal to rotational shafts of the first stick 1420A and the second stick 1420B, and the first ring gear 1431A and the second ring gear 1431B may be provided as worm wheel gears coaxially rotated with the rotational shafts of the first stick 1420A and the second stick 1420B engaged with the worm gears.

In addition, as illustrated in FIG. 11, the antenna steering driving unit 1400 may further include at least one support bearing 1450 disposed inside the motor housing 1410 and for supporting the rotations of the front end of the first motor shaft and the front end of the second motor shaft and the first driving gear 1441A and the second driving gear 1441B provided as the worm gears.

It is preferable that in the clamping apparatus 1000 for an antenna according to another embodiment of the present disclosure configured as described above, as illustrated in FIG. 12, when the steering driving motor 1440 is driven, the pair of moving sticks 1420A and 1420B may move in the front-rear direction according to an operating direction of the steering driving motor 1440 in a state of passing through the motor housing 1410 in the front-rear direction, and in this case, the screw gears (no reference numeral) are formed on all of the outer circumferential surfaces of the first stick 1420A and the second stick 1420B as described above in order to simultaneously receive the axial rotational driving force generated by the steering driving motor 1440.

Therefore, when the steering driving motor 1440 is driven, the pair of moving sticks 1420 may simultaneously move the same distance in the front-rear direction, and thus the antenna device A may more stably make the tilting movement in the front-rear direction.

Figure 13:
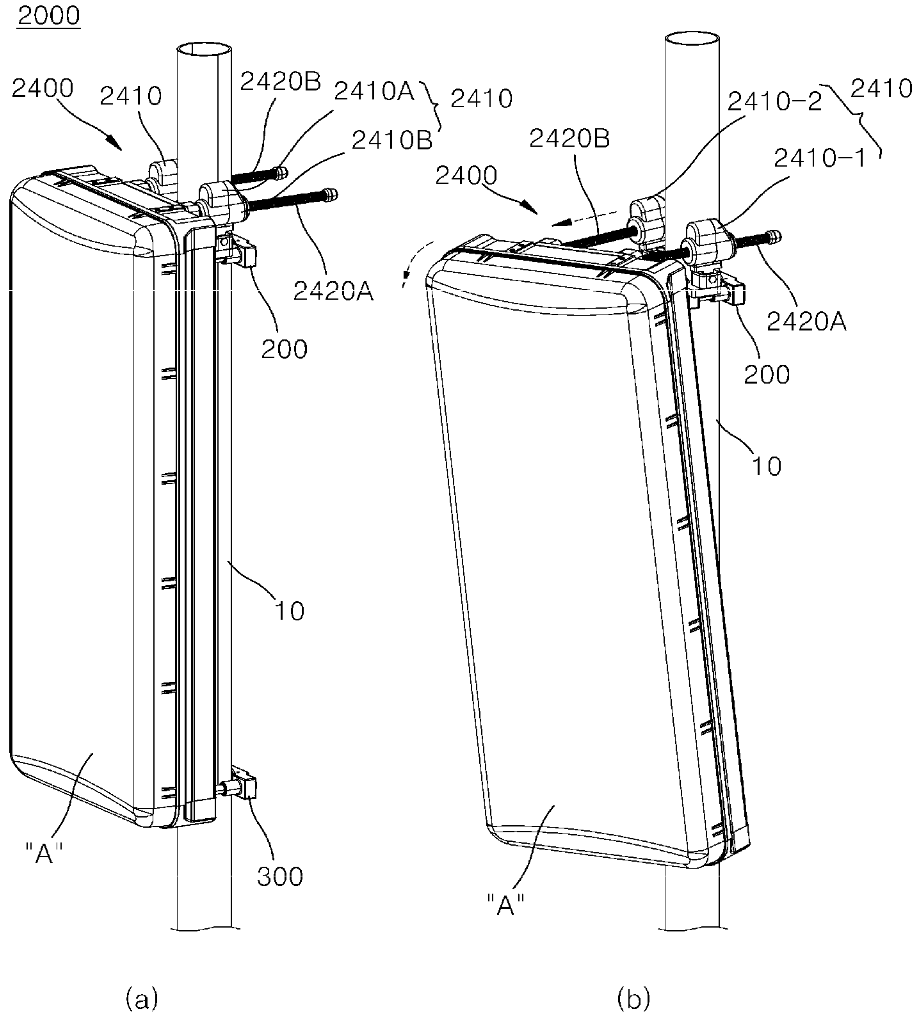
FIG. 13 is a perspective view illustrating states before and after the steering movement of a clamping apparatus for an antenna according to still another embodiment of the present disclosure.
Figure 14:
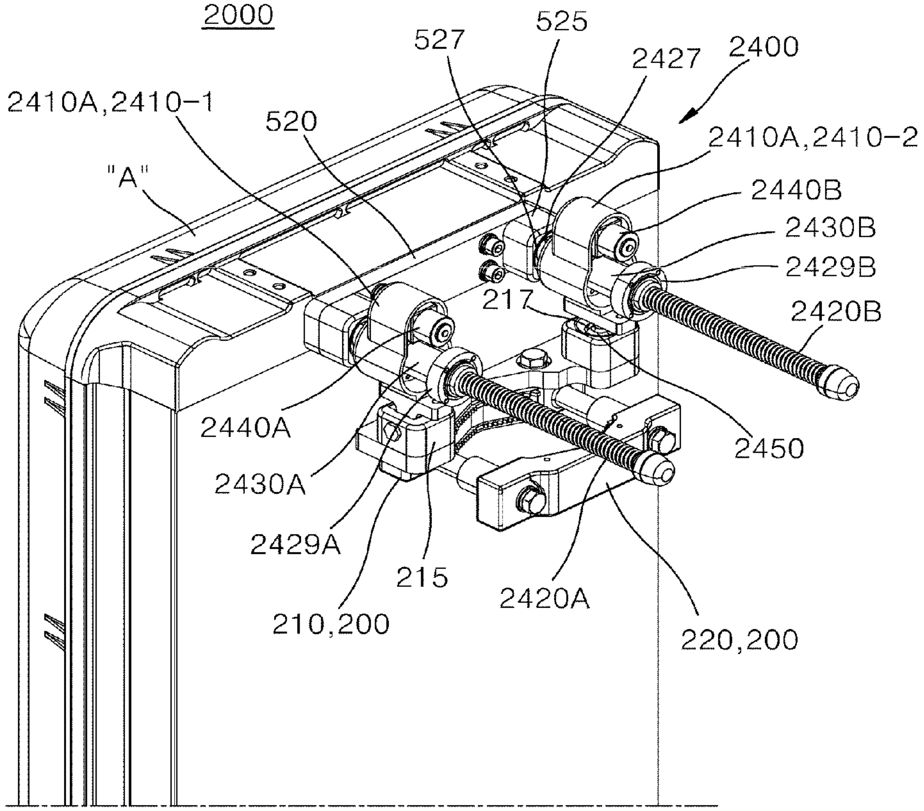
FIG. 14 is a perspective view illustrating an antenna steering driving unit among components of the clamping apparatus for an antenna according to still another embodiment of the present disclosure.
Figure 15:
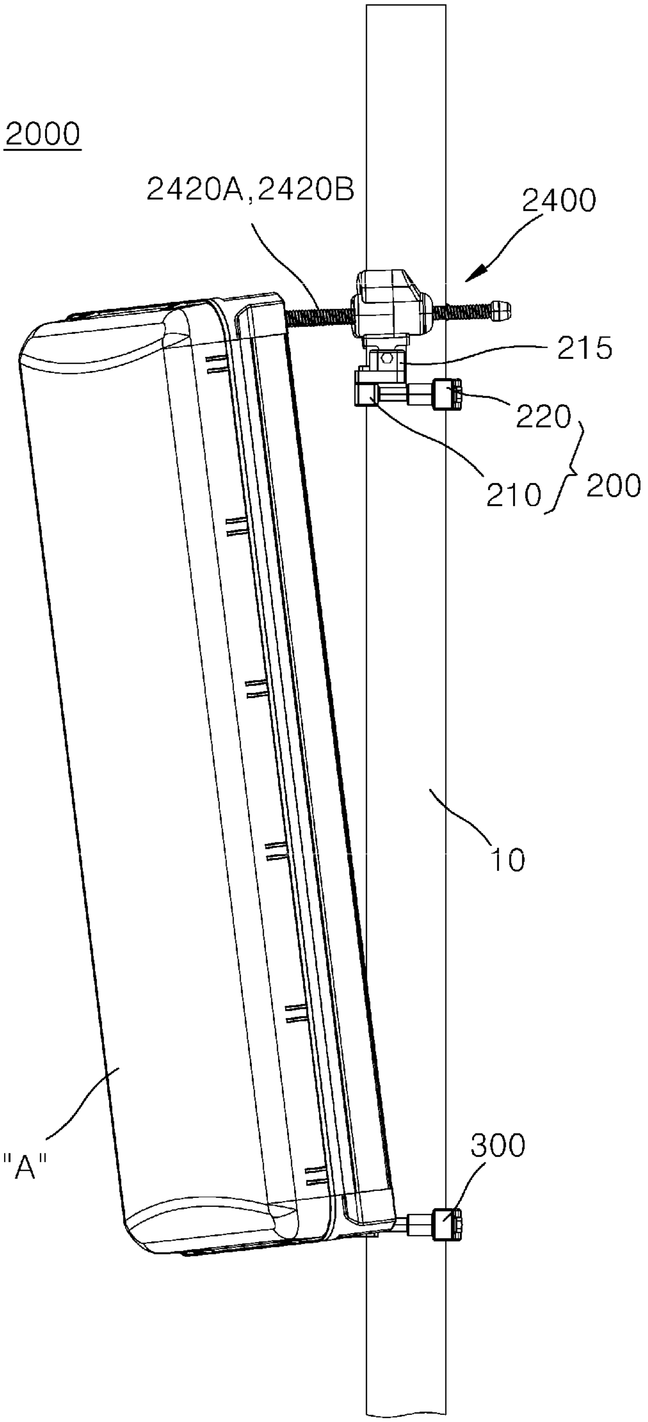
FIG. 15 is a side view of FIG. 13.
Figure 16:
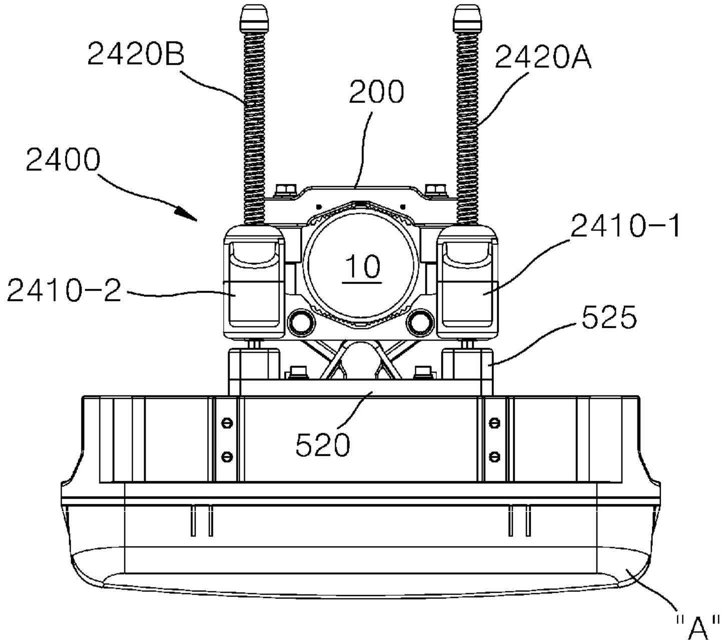
FIG. 16 is a plan view illustrating the states before and after the steering movement of the clamping apparatus for an antenna according to still another embodiment of the present disclosure.
Figure 16:
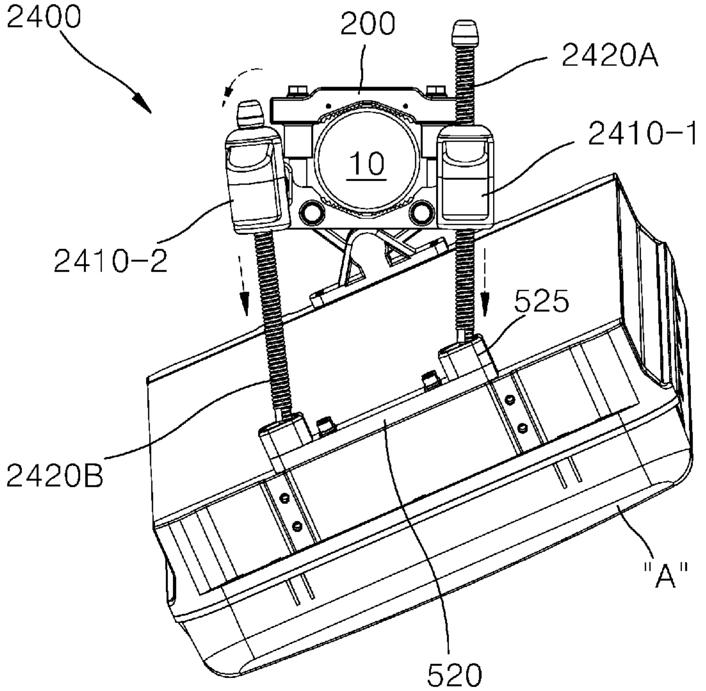

FIG. 13 is a perspective view illustrating states before and after the steering movement of a clamping apparatus for an antenna according to still another embodiment of the present disclosure, FIG. 14 is a perspective view illustrating an antenna steering driving unit among components of the clamping apparatus for an antenna according to still another embodiment of the present disclosure, FIG. 15 is a side view of FIG. 13, and FIG. 16 is a plan view illustrating the states before and after the steering movement of the clamping apparatus for an antenna according to still another embodiment of the present disclosure.

The clamping apparatus 100 for an antenna according to one embodiment of the present disclosure described with reference to FIGS. 1A to 9 and the clamping apparatus 1000 for an antenna according to another embodiment of the present disclosure described with reference to FIGS. 10 to 12 have a problem in which, since the steering driving motor 440 or 1440 among the components of the antenna steering driving unit 400 or 1400 is provided as a single one and any one or all of the pair of moving sticks 420 or 1420 receive the rotational driving force from the same steering driving motor 440 or 1440, it is possible to implement the tilting movement with respect to the support pole 10, but it is difficult to implement the rotating movement.

The clamping apparatus 2000 for an antenna according to still another embodiment of the present disclosure is provided so that a pair of steering driving motors 2440 among components of an antenna steering driving unit 2400 are provided (see reference numerals 2440A and 2440B in FIGS. 13 to 16) and provided to transmit each rotational driving force to the pair of moving sticks 2420A and 2420B in order to solve the problems of the clamping apparatus 100 for an antenna according to one embodiment and the clamping apparatus 1000 for an antenna according to another embodiment.

In other words, in the clamping apparatus 2000 for an antenna according to still another embodiment of the present disclosure, as illustrated in FIGS. 13 to 16, the antenna steering driving unit 2400 may further include the first steering driving motor 2440A for driving any one (first stick 2420A) of the pair of moving sticks 2420 to be axially rotated, the second steering driving motor 2440B for driving the other one (second stick 2420B) of the pair of moving sticks 2420 to be axially rotated, and a pair of motor housings 2410-1 and 2410-2 which is each connected to the upper mounting bracket unit 200 and in which each of the first steering driving motor 2440A and the second steering driving motor 2440B is embedded.

Here, like the clamping apparatus 100 for an antenna according to one embodiment and the clamping apparatus 1000 for an antenna according to another embodiment, each of the pair of moving sticks 2420 may move in the front-rear direction according to one of operating directions of the first steering driving motor 2440A and the second steering driving motor 2440B in a state of passing through any one of the pair of motor housings 2410 in the front-rear direction.

In addition, in the clamping apparatus 2000 for an antenna according to still another embodiment of the present disclosure, like the clamping apparatus 1000 for an antenna according to another embodiment, a screw gear may be formed on each of outer circumferential surfaces of the first stick 2420A and the second stick 2420B to transmit axial rotational driving forces generated by the first steering driving motor 2440A and the second steering driving motor 2440B.

Here, each of the first stick 2420A and the second stick 2420B may move the same axial moving distance or a different axial moving distance according to one of operating times of the first steering driving motor 2440A and the second steering driving motor 2440B while passing through the motor housing 2410 in the front-rear direction.

Meanwhile, in the clamping apparatus 2000 for an antenna according to still another embodiment of the present disclosure, the antenna steering driving unit 2400 may further include a first driving gear (not illustrated) and a second driving gear (not illustrated) coupled to each of front ends of motor shafts of the first steering driving motor 2440A and the second steering driving motor 2440B, and a pair of ring gears 2430A and 2430B each provided inside one of the motor housings 2410-1 and 2410-2, provided to surround the outer circumferential surface of each of the first stick 2420A and the second stick 2420B, having an inner circumferential surface formed with an inner teeth gear (not illustrated) engaged with the screw gear of each of the first stick 2420A and the second stick 2420B, and having outer circumferential surfaces formed with outer teeth gears (not illustrated) engaged with the first driving gear and the second driving gear.

Of course, it goes without saying that the same components 2430A and 2430B as the ring gears 430 and 1430 provided inside the motor housings 410 and 1410 in the clamping apparatus 100 for an antenna according to one embodiment of the present disclosure and the clamping apparatus 1000 for an antenna according to another embodiment of the present disclosure may also be interposed in the motor housings 2410-1 and 2410-2, respectively.

According to the clamping apparatus 2000 for an antenna according to still another embodiment of the present disclosure configured as described above, as illustrated in FIGS. 13 to 16, since moving distances of the first stick 2420A and the second stick 2420B in the front-rear direction are also the same when the operating times of the pair of steering driving motors 2440A and 2440B are the same, like the clamping apparatus 100 for an antenna according to one embodiment of the present disclosure and the clamping apparatus 1000 for an antenna according to another embodiment of the present disclosure, it is possible to implement only the tilting movement of the antenna device A, but since the moving distances of the first stick 2420A and the second stick 2420B in the front-rear direction are different when the operating times of the pair of steering driving motors 2440A and 2440B are different, it is possible to simultaneously implement not only the tilting movement but also the rotating movement in the left-right direction.

In particular, in the clamping apparatus 2000 for an antenna according to still another embodiment of the present disclosure, it goes without saying that not only it is possible to implement the rotating movement of the antenna device A at different operating times of the pair of steering driving motors 2440A and 2440B, but also it is possible to implement the rotating movement even when each of the pair of moving sticks 2420A and 2420B moves in a different direction.

In order to implement the rotating movement of the antenna device A as described above, as illustrated in FIG. 14, a joint ball 2427 may be provided on each of front end portions of the pair of moving sticks 2420A and 2420B, and each joint ball 2427 may be ball-joint-coupled to a ball insertion groove 527 of a ball joint unit 525 provided on the antenna upper bracket 520, and thus it is possible to implement not only the tilting movement but also the rotating movement of the antenna device A with respect to the support pole 10.

In addition, a joint ball 2450 may also be provided on a lower end portion of each of the pair of motor housings 2410-1 and 2410-2, and the joint ball 2450 may be ball-joint-coupled to a ball joint unit 215 provided on the front upper bracket 210 among the components of the upper mounting bracket unit 200 fixed to the outer circumferential surface of the support pole 10, and thus even when each of the pair of moving sticks 2420A and 2420B is rotated at a different angle for rotating movement, each of the pair of motor housings 2410-1 and 2410-2 may be freely rotated with respect to the front upper bracket 210 to enable the rotating movement of the antenna device A.

As described above, according to the clamping apparatus 2000 for an antenna according to still another embodiment of the present disclosure, by driving each of the pair of steering driving motors 2440A and 2440B identically or differently, it is possible to easily implement the tilting movement or the rotating movement of the antenna device A with respect to the longitudinal direction of the support pole 10 by the same moving distance or different moving distances of the pair of moving sticks 2420A and 2420B.

The clamping apparatuses for an antenna according to various embodiments of the present disclosure have been described above in detail with reference to the accompanying drawings. However, it goes without saying that the embodiments of the present disclosure are not limited by the above-described embodiments, and various modifications and implementation within the equivalent scope are possible by those skilled in the art to which the present disclosure pertains. Therefore, the true scope of the present disclosure will be determined by the claims to be described below.

INDUSTRIAL APPLICABILITY

The present disclosure provides a clamping apparatus for an antenna, which may mount an antenna device on a support pole to have a minimum separation distance, easily adjust a directionality of the antenna device including tilting and rotating movements, and selectively apply a specification in which a directionality according to only the tilting movement may be adjusted or a specification in which a directionality according to the tilting movement and rotating movement may be adjusted to meet a mounting place of the antenna device.

The invention claimed is:

1. A clamping apparatus for an antenna, comprising:

a mounting bracket unit functioning as a medium for coupling of an antenna device to a support pole disposed to extend in a longitudinal direction of the support pole; and an antenna steering driving unit coupled to the mounting bracket unit and configured to drive a rear surface of the antenna device to make a steering movement with respect to the longitudinal direction of the support pole, wherein the antenna steering driving unit includes a pair of moving sticks of which a front end portion is coupled to the rear surface of the antenna device, and the pair of moving sticks are moved by the same distance or different distances with the support pole interposed therebetween so that the rear surface of the antenna device makes a tilting movement or a rotating movement with respect to the longitudinal direction of the support pole, wherein the antenna steering driving unit further includes:

a steering driving motor configured to drive a first stick of the pair of moving sticks to be axially rotated; and a motor housing which is connected to the mounting bracket unit and in which the steering driving motor is embedded, and the pair of moving sticks are movable in a front-rear direction according to an operating direction of the steering driving motor in a state of passing through the motor housing in the front-rear direction, wherein a screw gear is formed on an outer circumferential surface of the first stick to transmit an axial rotational driving force generated by the steering driving motor, and a second stick of the pair of moving sticks moves the same distance as an axial moving distance of the first stick while passing through the motor housing in the front-rear direction.

2. The clamping apparatus of claim 1, wherein the antenna steering driving unit further includes:

a driving gear coupled to a front end of a motor shaft of the steering driving motor; and a ring gear provided inside the motor housing, provided to surround the outer circumferential surface of the first stick, having an inner circumferential surface formed with an inner teeth gear engaged with the screw gear of the first stick, and having an outer circumferential surface formed with an outer teeth gear engaged with the driving gear.

3. The clamping apparatus of claim 1, wherein the mounting bracket unit includes:

a lower mounting bracket unit functioning as a medium for coupling of a lower end portion of the antenna device to the support pole; and an upper mounting bracket unit functioning as a medium for coupling of an upper end portion of the antenna device to the support pole, and the motor housing or the pair of motor housings are connected to the upper mounting bracket unit.

4. The clamping apparatus of claim 3, further comprising: an antenna lower bracket coupled to a rear surface of the lower end portion of the antenna device and functioning as a medium for mounting of the lower end portion of the antenna device on the lower mounting bracket unit; and an antenna upper bracket coupled to a rear surface of the upper end portion of the antenna device and functioning as a medium for mounting of the upper end portion of the antenna device on front end portions of the pair of moving sticks, wherein the antenna lower bracket is ball-joint-coupled to the lower mounting bracket unit.

5. The clamping apparatus of claim 4, wherein a joint ball is provided on the lower mounting bracket unit, and a ball support groove is provided in a lower portion of the antenna lower bracket to be open downward, and the lower mounting bracket unit further includes a ball separation prevention cap configured to prevent the joint ball from being arbitrarily separated from the ball support groove from a state in which an upper end portion of the joint ball is accommodated in the ball support groove.

6. The clamping apparatus of claim 4, wherein, as a case in which one steering driving motor is provided, the front end portions of the pair of moving sticks are hinge-coupled to the antenna upper bracket to be freely rotated with respect to each left-right horizontal axis.

7. The clamping apparatus of claim 4, wherein, as a case in which a pair of steering driving motors is provided, the front end portions of the pair of moving sticks are ball-joint-coupled to the antenna upper bracket.

8. The clamping apparatus of claim 4, wherein, as a case in which a pair of steering driving motors is provided, each of the pair of motor housings is ball-joint-coupled to the mounting bracket unit.

9. A clamping apparatus for an antenna, comprising:

a mounting bracket unit functioning as a medium for coupling of an antenna device to a support pole disposed to extend in a longitudinal direction of the support pole; and an antenna steering driving unit coupled to the mounting bracket unit and configured to drive a rear surface of the antenna device to make a steering movement with respect to the longitudinal direction of the support pole, wherein the antenna steering driving unit includes a pair of moving sticks of which a front end portion is coupled to the rear surface of the antenna device, and the pair of moving sticks are moved by the same distance or different distances with the support pole interposed therebetween so that the rear surface of the antenna device makes a tilting movement or a rotating movement with respect to the longitudinal direction of the support pole, wherein the antenna steering driving unit further includes:

a steering driving motor configured to drive a first stick of the pair of moving sticks and a second stick of the pair of moving sticks to be axially rotated at the same time; and a motor housing which is connected to the mounting bracket unit and in which the steering driving motor is embedded, and the pair of moving sticks are movable in a front-rear direction according to an operating direction of the steering driving motor in a state of passing through the motor housing in the front-rear direction, wherein screw gears are formed on outer circumferential surfaces of the first stick and the second stick to transmit an axial rotational driving force generated by the steering driving motor, and the second stick moves the same distance as an axial moving distance of the first stick while passing through the motor housing in the front-rear direction.

10. The clamping apparatus of claim 9, wherein the steering driving motor includes a first motor shaft and a second motor shaft extending from an inside of the motor housing toward the first stick and the second stick, respectively, and the antenna steering driving unit further includes:

a first driving gear and a second driving gear respectively coupled to a front end of the first motor shaft and a front end of the second motor shaft of the steering driving motor; and a first ring gear and a second ring gear provided inside the motor housing, provided to surround the outer circumferential surface of each of the first stick and the second stick, having an inner circumferential surface formed with an inner teeth gear engaged with a screw gear of each of the first stick and the second stick, and having outer circumferential surfaces formed with outer teeth gears engaged with the first driving gear and the second driving gear.

11. The clamping apparatus of claim 10, wherein the first driving gear and the second driving gear are provided as worm gears disposed to be orthogonal to rotational shafts of the first stick and the second stick, and the first ring gear and the second ring gear are provided as worm wheel gears engaged with the worm gear and coaxially rotated with the rotational shafts of the first stick and the second stick.

12. The clamping apparatus of claim 11, wherein the antenna steering driving unit further includes at least one support bearing disposed inside the motor housing and configured to support the rotations of the front end of the first motor shaft and the front end of the second motor shaft and the first driving gear and the second driving gear provided as the worm gears.

13. A clamping apparatus for an antenna, comprising:

a mounting bracket unit functioning as a medium for coupling of an antenna device to a support pole disposed to extend in a longitudinal direction of the support pole; and an antenna steering driving unit coupled to the mounting bracket unit and configured to drive a rear surface of the antenna device to make a steering movement with respect to the longitudinal direction of the support pole, wherein the antenna steering driving unit includes a pair of moving sticks of which a front end portion is coupled to the rear surface of the antenna device, and the pair of moving sticks are moved by the same distance or different distances with the support pole interposed therebetween so that the rear surface of the antenna device makes a tilting movement or a rotating movement with respect to the longitudinal direction of the support pole, wherein the antenna steering driving unit further includes:

a first steering driving motor configured to drive a first stick of the pair of moving sticks to be axially rotated;

a second steering driving motor configured to drive a second stick of the pair of moving sticks to be axially rotated; and a pair of motor housings which is each connected to the mounting bracket unit and in which each of the first steering driving motor and the second steering driving motor is embedded, and each of the pair of moving sticks is movable in a front-rear direction according to one of operating directions of the first steering driving motor and the second steering driving motor in a state of passing through any one of the pair of motor housings in the front-rear direction, wherein a screw gear is formed on each of outer circumferential surfaces of the first stick and the second stick to transmit axial rotational driving forces generated by the first steering driving motor and the second steering driving motor, and each of the first stick and the second stick moves the same axial moving distance or a different axial moving distance according to one of operating times of the first steering driving motor and the second steering driving motor while passing through the motor housing in the front-rear direction.

14. The clamping apparatus of claim 13, wherein the antenna steering driving unit further includes:

a first driving gear and a second driving gear each coupled to one of front ends of motor shafts of the first steering driving motor and the second steering driving motor; and a pair of ring gears provided inside the motor housing, provided to surround an outer circumferential surface of each of the first stick and the second stick, having an inner circumferential surface formed with an inner teeth gear engaged with a screw gear of each of the first stick and the second stick, and having outer circumferential surfaces formed with outer teeth gears engaged with the first driving gear and the second driving gear.

15. The clamping apparatus of claim 13, wherein, when the operating times of the first steering driving motor and the second steering driving motor are the same, an upper end portion of the antenna device makes tilting movement in the front-rear direction based on a lower end portion of the antenna device with respect to the support pole, and when the operating times of the first steering driving motor and the second steering driving motor are different, the upper end portion of the antenna device makes the tilting movement in the front-rear direction and at the same time, rotating movement in a left-right direction based on the lower end portion of the antenna device with respect to the support pole.

* * * * *